(12) United States Patent
Sugawara

(10) Patent No.: US 11,108,765 B2
(45) Date of Patent: Aug. 31, 2021

(54) INFORMATION PROCESSING SYSTEM, CONTROL METHOD, AND STORAGE MEDIUM THEREFOR

(71) Applicant: CANON KABUSHIKI KAISHA, Tokyo (JP)

(72) Inventor: Akira Sugawara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 348 days.

(21) Appl. No.: 15/975,665

(22) Filed: May 9, 2018

(65) Prior Publication Data

US 2018/0337912 A1 Nov. 22, 2018

(30) Foreign Application Priority Data

May 17, 2017 (JP) .............................. JP2017-098378

(51) Int. Cl.
| | |
|---|---|
| *H04L 29/06* | (2006.01) |
| *G06F 3/12* | (2006.01) |
| *G06F 21/60* | (2013.01) |
| *H04N 1/00* | (2006.01) |
| *H04N 1/44* | (2006.01) |

(52) U.S. Cl.
CPC .......... *H04L 63/083* (2013.01); *G06F 3/1222* (2013.01); *G06F 3/1238* (2013.01); *G06F 3/1288* (2013.01); *G06F 21/608* (2013.01); *H04L 63/0861* (2013.01); *H04N 1/0023* (2013.01); *H04N 1/4413* (2013.01); *H04N 2201/0018* (2013.01); *H04N 2201/0082* (2013.01); *H04N 2201/0094* (2013.01)

(58) Field of Classification Search
CPC . H04L 63/083; H04L 63/0861; G06F 21/608; G06F 3/1222; G06F 3/1238; G06F 3/1288
See application file for complete search history.

(56) References Cited

U.S. PATENT DOCUMENTS

| | | | | |
|---|---|---|---|---|
| 8,509,431 | B2* | 8/2013 | Schmidt | .................. H04L 63/08 380/44 |
| 9,019,525 | B2* | 4/2015 | Ohno | ..................... G06F 3/1273 358/1.13 |
| 9,330,245 | B2* | 5/2016 | Maron | ..................... G06F 21/31 |
| 9,503,452 | B1* | 11/2016 | Kumar | .................. H04L 67/306 |
| 10,193,864 | B2* | 1/2019 | Toy | ..................... H04L 67/1097 |
| 2011/0099616 | A1 | 4/2011 | Mazur | |
| 2012/0050793 | A1* | 3/2012 | Miyazawa | ............ G06F 3/1288 358/1.15 |

(Continued)

FOREIGN PATENT DOCUMENTS

| | | |
|---|---|---|
| CN | 102647407 A | 8/2012 |
| CN | 103019628 A | 4/2013 |

(Continued)

*Primary Examiner* — Sher A Khan
(74) *Attorney, Agent, or Firm* — Canon U.S.A., Inc. IP Division

(57) ABSTRACT

A cloud system and a device associate cloud user authentication information and local user authentication information with each other and manage the cloud user authentication information and the local user authentication information. The local user authentication information and the execution request are transmitted to the device, and the cloud user authentication information and an execution result are transmitted to the cloud system.

11 Claims, 18 Drawing Sheets

(56) References Cited

U.S. PATENT DOCUMENTS

| | | | |
|---|---|---|---|
| 2012/0050795 A1* | 3/2012 | Nakamura | G06F 3/1287 358/1.15 |
| 2012/0188600 A1* | 7/2012 | Oshima | G06F 3/1288 358/1.15 |
| 2012/0300249 A1* | 11/2012 | Shustef | G06F 3/1287 358/1.15 |
| 2013/0070288 A1 | 3/2013 | Muranaka | |
| 2013/0083353 A1* | 4/2013 | Nishikawa | G06F 3/1247 358/1.15 |
| 2013/0100480 A1* | 4/2013 | Ikeda | G06F 3/1238 358/1.14 |
| 2013/0114107 A1* | 5/2013 | Park | G06F 3/1204 358/1.15 |
| 2013/0185809 A1* | 7/2013 | Yabe | H04L 63/10 726/28 |
| 2013/0215455 A1* | 8/2013 | Armstrong | G06F 21/608 358/1.15 |
| 2013/0235418 A1 | 9/2013 | Tanaka | |
| 2013/0242334 A1 | 9/2013 | Ichida | |
| 2015/0015908 A1* | 1/2015 | Tanaka | H04N 1/4413 358/1.14 |
| 2015/0199161 A1* | 7/2015 | Gutnik | G06F 3/1222 358/1.15 |
| 2016/0004483 A1* | 1/2016 | Yamakawa | G06F 3/1285 358/1.14 |
| 2016/0041798 A1* | 2/2016 | Maekawa | G06F 3/1222 358/1.15 |
| 2016/0203533 A1 | 7/2016 | Cheng | |
| 2017/0006019 A1* | 1/2017 | Addala | H04L 63/083 |
| 2017/0013169 A1* | 1/2017 | Kim | H04N 1/4413 |
| 2020/0382492 A1* | 12/2020 | Kalaboukis | H04L 63/0861 |

FOREIGN PATENT DOCUMENTS

| | | | |
|---|---|---|---|
| CN | 103309628 A | 9/2013 | |
| CN | 104123106 A | 10/2014 | |
| CN | 104284040 A | 1/2015 | |
| JP | 2016018331 A | 2/2016 | |
| WO | 2015/059524 A1 | 4/2015 | |
| WO | WO-2015059524 A1 * | 4/2015 | G06F 3/1273 |

* cited by examiner

FIG. 9

| SETTING SCREEN | | |
|---|---|---|
| DEVICE IDENTIFICATION INFORMATION: 00001 | | INPUT COMPLETED |
| SETTING ITEM | CURRENT SETTING | SETTING VALUE |
| AUTO SLEEP TRANSIT TIME | NONE | |
| SETTING LOCATION | NONE | |
| USER NAME | Administrator | |

EXECUTION RESULT SCREEN

DEVICE IDENTIFICATION INFORMATION: 00001

| SETTING ITEM | RESULT | BEFORE SETTING | AFTER SETTING |
|---|---|---|---|
| AUTO SLEEP TRANSIT TIME | OK | NONE | 5 MINUTES |
| SETTING LOCATION | OK | NONE | 3F, XXX COMPANY |
| USER NAME | NG | Administrator | — |

EXECUTION RESULT SELECTION SCREEN

DEVICE IDENTIFICATION INFORMATION: 00001

| REQUEST DATE AND TIME | CONTENT OUTLINE | RESPONSE DATE AND TIME | CONTENT OUTLINE |
|---|---|---|---|
| 12/19/2016 12:45:00 | AUTO CLEAR AUTO SLEEP ... | 12/19/2016 12:55:00 | AUTO CLEAR AUTO SLEEP ... |
| 12/20/2016 15:00:00 | IP ADDRESS INSTALLATION LOCATION ... | 12/20/2016 15:10:00 | IP ADDRESS INSTALLATION LOCATION ... |
| ... | | | |

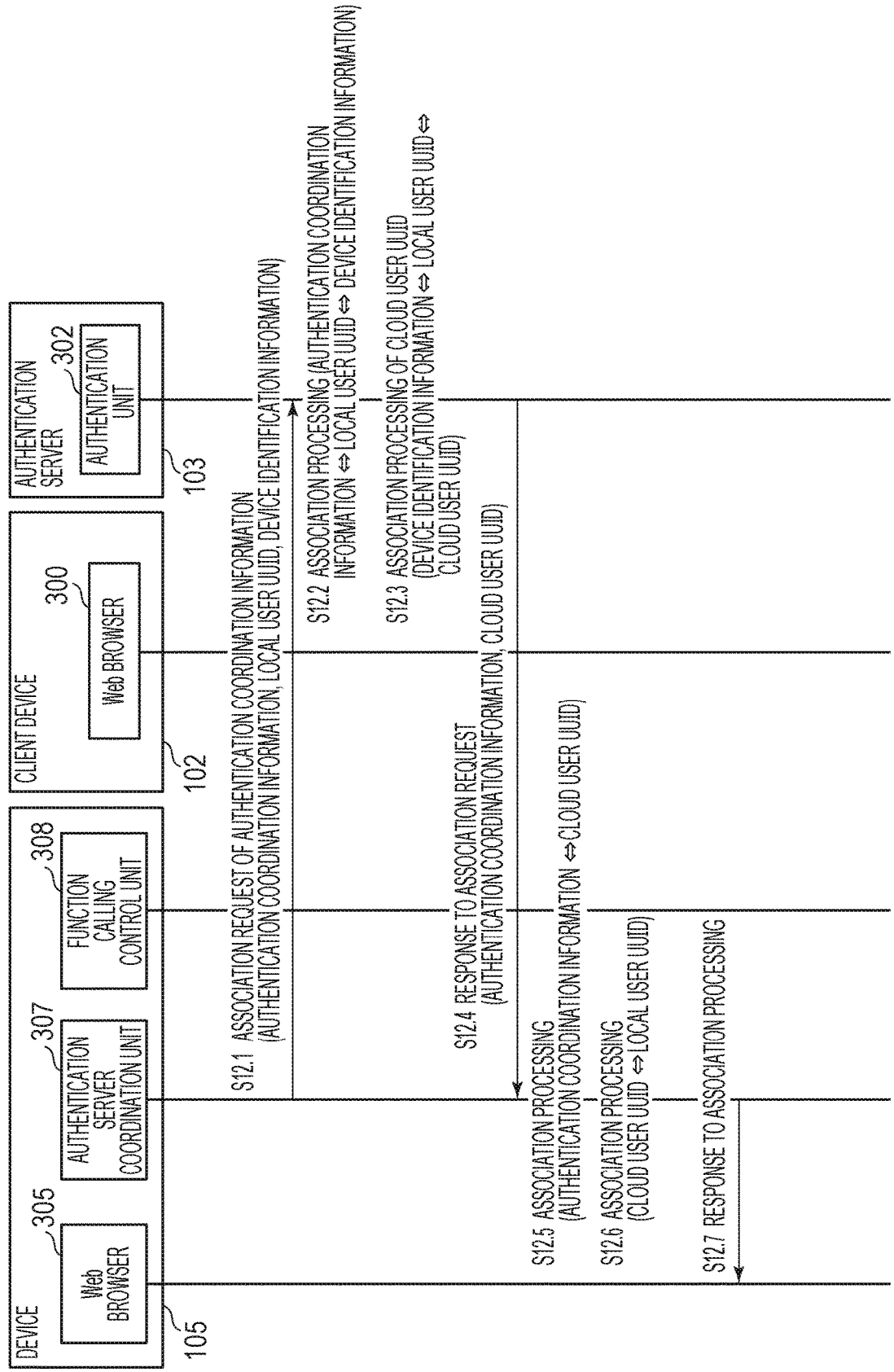

INFORMATION PROCESSING SYSTEM, CONTROL METHOD, AND STORAGE MEDIUM THEREFOR

BACKGROUND

Field

The present disclosure relates to an information processing system that executes a function of a device via a cloud system, a control method, and a storage medium therefor.

Description of the Related Art

A service for transmitting data from a client device via a cloud system to another device is being developed. In addition, a device has been proposed which identifies a user who uses a function of the device (such a user will hereinafter be referred to as a local user) and provides a local user account to restrict the device function that the user can use. The local user account is needed to execute the device function in the above-described device. On the other hand, a cloud system is being developed which identifies a user who uses a cloud service in the cloud system (such a user will hereinafter be referred to as a cloud user) and provides a cloud user account to restrict the cloud service that the user can use. The cloud user account is needed to execute the cloud service in the above-described cloud system.

Japanese Patent Laid-Open No. 2016-18331 describes a printing system in which printing of a print job is executed in a case where a user is authenticated by user account information.

SUMMARY

Various embodiments of the present disclosure provide the following configuration of an information processing system. That is, the information processing system includes a first management unit configured to cause a cloud system to associate cloud user authentication information for uniquely identifying a cloud user who uses a cloud service and local user authentication information for uniquely identifying a plurality of local users who use a function of a device, with each other, and manage the cloud user authentication information and the local user authentication information, a second management unit configured to cause the device to associate the cloud user authentication information and the local user authentication information with each other, and manage the cloud user authentication information and the local user authentication information, a first transmission unit configured to receive a request for executing a function of the device from a client device and transmit, to the device, the local user authentication information associated with the cloud user authentication information and managed by the first management unit, and an execution request corresponding to the request, and a second transmission unit configured to cause the device to execute the execution request transmitted by the first transmission unit on a basis of the local user authentication information transmitted by the first transmission unit and cause the device to transmit, to the cloud system, the cloud user authentication information associated with the local user authentication information received from the cloud system together with the execution request and managed by the second management unit, and an execution result obtained by executing the execution request.

Further features will become apparent from the following description of exemplary embodiments with reference to the attached drawings.

BRIEF DESCRIPTION OF THE DRAWINGS

FIG. 9 illustrates a setting screen of a Web browser according to an exemplary embodiment of the present disclosure.

FIG. 10 illustrates an execution result screen of the Web browser according to an exemplary embodiment of the present disclosure.

FIG. 11 illustrates an execution result selection screen of the Web browser according to an exemplary embodiment of the present disclosure.

FIG. 19 is a sequence diagram illustrating the user association processing for associating the local user UUID and the cloud user UUID with each other in the authentication server according to an exemplary embodiment of the present disclosure.

DESCRIPTION OF THE EMBODIMENTS

It is assumed that a single user registers a local user account to use a device function in a device and also registers a cloud user account to use a cloud service in a cloud system. A mode is considerable in which execution of a function of a multi-user device in a multi-function peripheral (MFP) corresponding to one of the cloud services is requested by using both of the user accounts. Then, the requested function is executed by the multi-user device, and the execution result is transmitted from the multi-user device to the cloud system. Herein, the multi-user device refers to a device that includes a function for managing a plurality of local users and needs a login operation when the device function is to be used.

According to the mode in which the execution of the function of the multi-user device is requested by using the local user account and the cloud user account and the execution result with respect to the execution request is transmitted to the cloud system, the multi-user device obtains the execution request from the cloud system by a pull-type communication, and the execution result with respect to the execution request is transmitted by the multi-user device to the cloud system in some cases. With regard to the pull-type communication, the multi-user device requests the cloud system for the obtainment of the execution request, and the multi-user device receives the execution request from the cloud system as the response to end the communication. For this reason, even when the execution result is transmitted from the multi-user device to the cloud system, since the pull-type communication in which the execution request is obtained and the communication in which the execution result is transmitted are mutually independent asynchronous communications, the cloud system does not determine what kind of execution result is obtained with respect to which execution request. That is, a technology for associating the request and the response with each other is needed to find out a request (execution request) to which the response (execution result) has been made.

According to various embodiments, when the function of the multi-user device is executed via the cloud system, it is aimed at identifying the local user account used for executing the function by the multi-user device and identifying the cloud user account to which the execution result has been made by the cloud system to associate the request and the response with each other.

According to the various embodiments, when the function of the multi-user device is executed via the cloud system, it is possible to identify the local user account used for executing the function by the multi-user device and identify the cloud user account to which the execution result has been made by the cloud system to associate the request and the response with each other.

Hereinafter, exemplary embodiments will be described.

Figure 1:
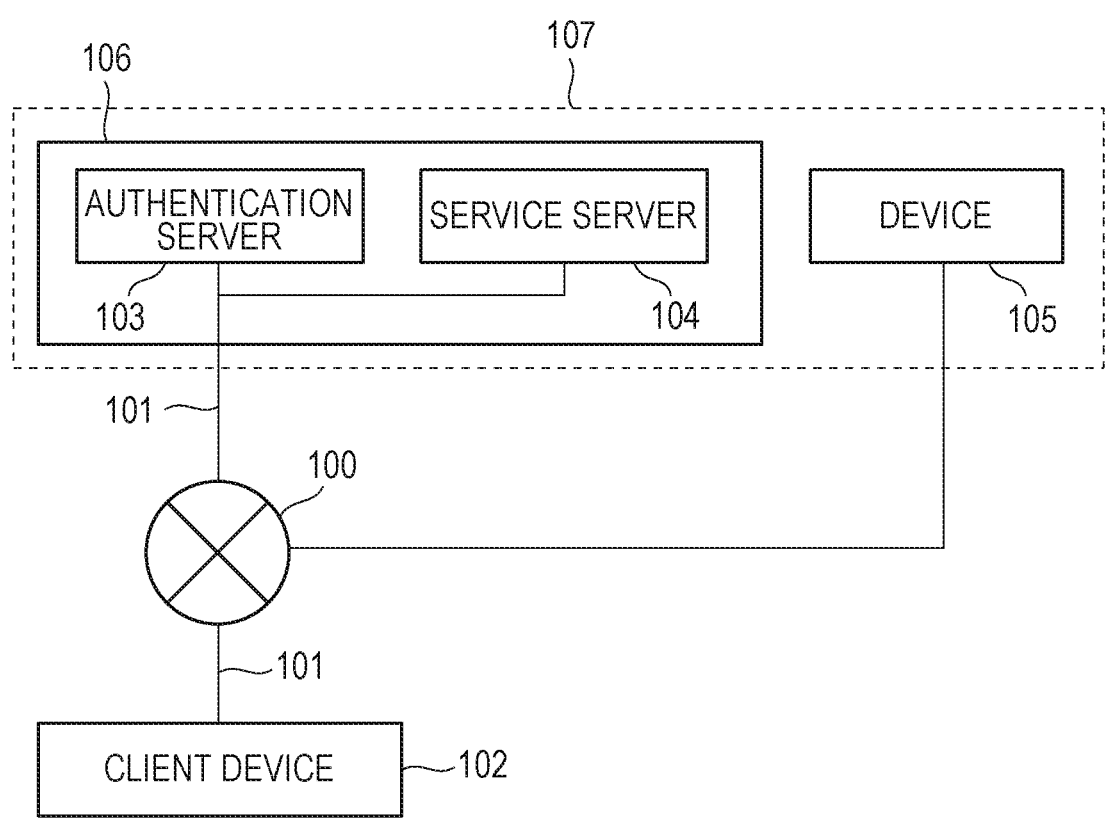
FIG. 1 is an overall view of an information processing system according to an exemplary embodiment of the present disclosure.

A device 105 and a cloud system 106 which constitute an information processing system 107 according to one exemplary embodiment, and further a client device 102 connected to the information processing system 107 will be described with reference to FIG. 1. FIG. 1 illustrates a state in which the client device 102 connects a server computer group constituting the information processing system 107 to the device 105 via a wide area network (WAN) 100. The WAN 100 is connected to the respective devices by a local area network (LAN) 101.

The client device 102 is an information processing apparatus such as a personal computer (PC), a smart phone, a tablet, or an image forming apparatus. An authentication server 103 authenticates a user such as a cloud user or a local user or the device 105 such as an MFP and registers its authentication information.

A service server 104 can communicate with the client device 102 and the device 105 via the WAN 100. A server that performs a message communication based on Message Queuing Telemetry Transport (MQTT) Broker or the like is exemplified as the service server 104. The MQTT refers to a message communication protocol of a "publish/subscribe model". According to the publish/subscribe model, a message is distributed from a message sender (hereinafter, which will be referred to as a publisher) to a message recipient (hereinafter, which will be referred to as a subscriber) via the MQTT Broker functioning as a message broker. According to the exemplary embodiment, the descriptions will be provided while it is assumed that the service server 104 has a function of the MQTT Broker. The subscriber transmits the message to the service server 104 by specifying the subscriber itself as a transmission destination of the message (hereinafter, which will be referred to as a topic) and reserves such that a message matched with the topic can be received from the service server 104 (hereinafter, which will be referred to as subscribe). A message to be transmitted by the subscriber to the service server 104 to subscribe will be referred to as a "subscribe message".

The publisher transmits the message in which the topic is specified to the service server 104. The service server 104 distributes the message to the subscriber who subscribes the same topic as the specified above (hereinafter, which will be referred to as publish). A message transmitted by the publisher to the service server 104 by specifying the topic to publish and a message transmitted to the subscriber will be referred to as a "publish message".

The topic has a hierarchical structure separated by "/" (for example: /A/BC/D/E). When full matching or partial matching of the topic is specified on the subscriber side, the message of the topic matched with the specified condition can be received by the subscriber. The MQTT Broker checks whether the topic of the received publish message and the topic of the subscribe message are matched or not matched with each other and transmits the publish message to the subscriber in a case where the topics are matched with each other. With this configuration, even when a communication from the service server 104 to the device 105 is interrupted by firewall, a communication to the device 105 can be performed by using the MQTT.

According to the exemplary embodiments which will be described below, the descriptions will be provided while it is assumed that the service server 104 includes the function of the MQTT Broker, but a mode may also be adopted in which the device 105 uses other protocols as long as the request can be obtained from the service server 104. For example, a mode is also considerable in which the device 105 regularly performs request for obtaining information with respect to the service server 104 and receives the request from the service server 104 by its response.

Furthermore, the service server 104 provides a service such as a setting change service to the client device 102. In the setting change service, a screen for accepting a setting change in the device 105 or a screen for checking a setting change result requested by the cloud user is provided to the client device 102. The setting change request issued in accordance with a user operation on the client device 102 is delivered to the device 105 via the service server 104. The service server 104 also provides a function calling control service for providing the setting change service. In the function calling control service, control is performed such that acceptance of the request requested by the client device 102 to provide the setting change service or the execution result received from the device 105 is displayed to only the specified cloud user. According to the exemplary embodiments which will be described below, the explanation will be made by way of an example in which the service server 104 provides the setting change service of the device 105, but other services such as a printing service may also be used. In addition, a mode may also be adopted in which a plurality of services such as the printing service and the setting change service are provided.

The device 105 is an information processing apparatus such as an image forming apparatus, a PC, or a smart phone and is a device including a function for managing information related to a plurality of local users. When the subscribe message in which the topic is specified is transmitted to the service server 104 functioning as the MQTT Broker, the device 105 can receive the publish message having the topic matched with the specified topic.

In addition, the respective server computers such as the authentication server 103 and the service server 104 according to exemplary embodiments of the present disclosure may be constituted by a plurality of devices, or alternatively, a single computer server may include both functions of the authentication server 103 and the service server 104. For example, the service server 104 can be divided into the MQTT Broker and a function calling control service that provides the function calling control service.

Figure 2:
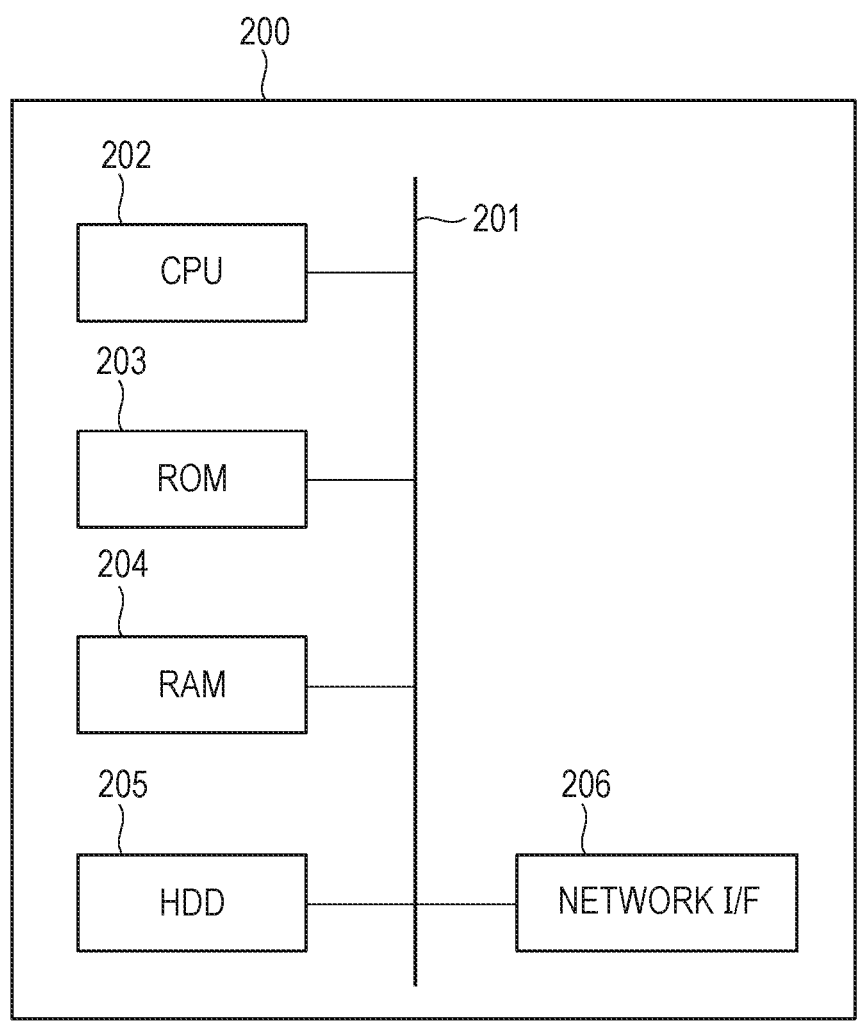
FIG. 2 is an internal configuration diagram of an information processing apparatus according to an exemplary embodiment of the present disclosure.

FIG. 2 is a block diagram illustrating an internal configuration of an information processing apparatus 200 functioning as a server computer constituting the cloud system 106 illustrated in FIG. 1. It should be noted that the client device 102 and the device 105 also have internal structures similar to those of the information processing apparatus 200 in the block diagram illustrated in FIG. 2.

A central processing unit (CPU) 202, a read-only memory (ROM) 203, a random access memory (RAM) 204, and a hard disc drive (HDD) 205 are connected to one another via an internal bus 201 in the information processing apparatus 200. The CPU 202 is a unit configured to execute a boot program of the ROM 203 to develop an operating system (OS) or a control program stored in the HDD 205 onto the RAM 204 and perform the control of the information processing apparatus 200 on the basis of the program.

The ROM 203 is a storage device that stores the boot program of the information processing apparatus 200, various data, and the like.

The RAM 204 is a work memory used when the CPU 202 execute commands. The program saved in the ROM 203 is loaded onto the RAM 204, and the commands of the program are sequentially read out to execute the commands.

The HDD 205 is an external storage device and stores the OS and various programs.

A network interface (I/F) 206 is connected to the CPU 202, the ROM 203, the RAM 204, and the HDD 205 via the internal bus 201 and performs input and output of information with respect to the information processing apparatus 200 via a network such as the LAN 101.

It should be noted that a main constituent on hardware such as the computer server or the device is the CPU 202, and a main constituent on software is an application program installed into the HDD 205 in the entire explanation which will be described below unless otherwise stated.

Figure 3:
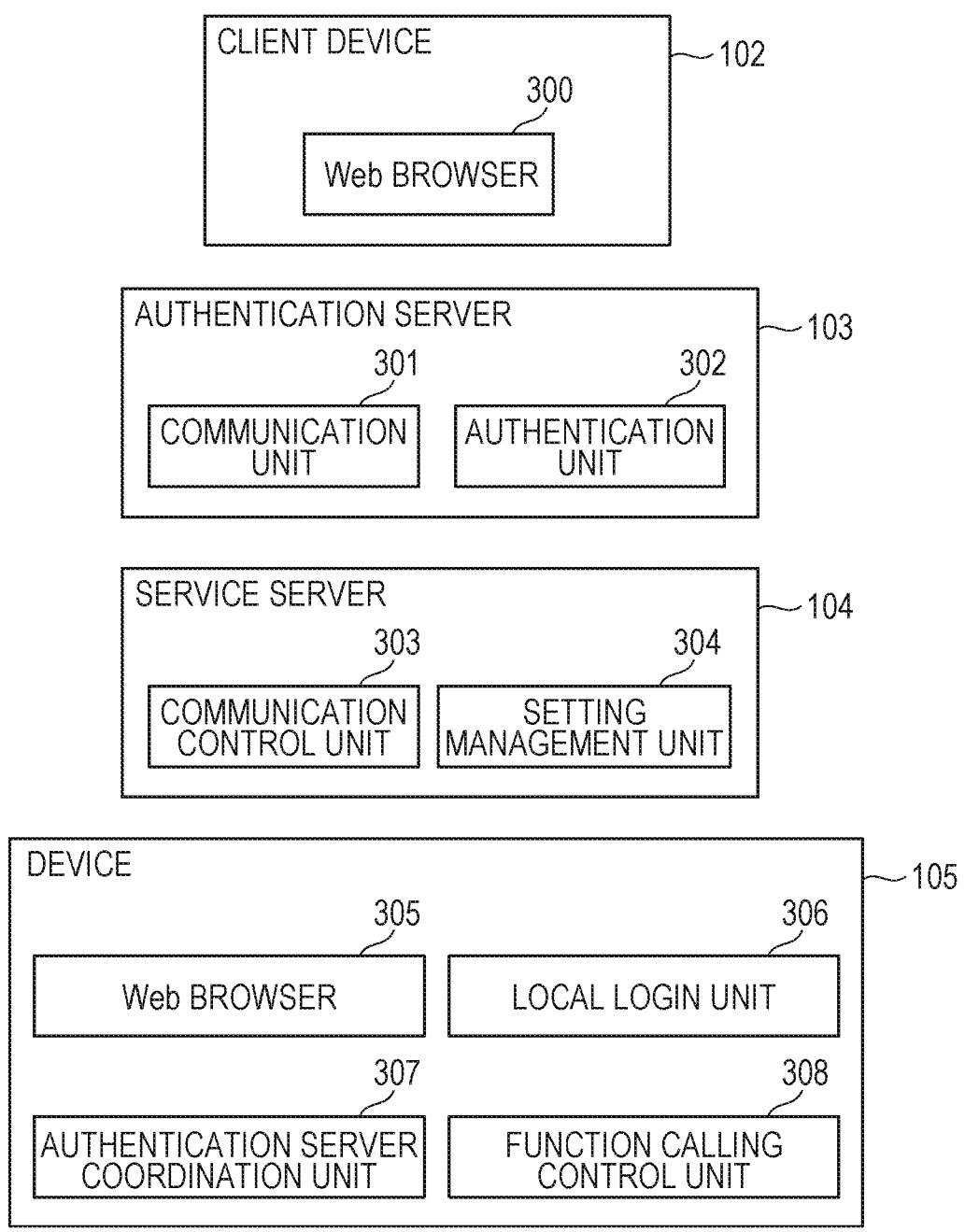
FIG. 3 is a function block diagram of respective apparatuses constituting an information processing system and a client device according to an exemplary embodiment of the present disclosure.

Functions included in the client device 102, the authentication server 103, the service server 104, and the device 105 will be described with reference to FIG. 3. The functions of the apparatuses including a Web browser 300 included in the client device 102 in the information processing system 107 according to the present exemplary embodiment are realized when the CPU 202 in each of the apparatuses executes the application program loaded onto the RAM 204. In particular, a function or a function group realized on the server computer such as the authentication server 103 or the service server 104 among the functions is referred to as a cloud service.

The client device 102 is provided with the Web browser 300, and the Web browser 300 performs communications with the authentication server 103 and the service server 104. The Web browser 300 is a function realized by a user agent for using World Wide Web (WWW), and a Web browser 305 which will be described below also has a similar function.

The authentication server 103 is provided with a communication unit 301 and an authentication unit 302. The authentication unit 302 is a function for performing communications with the client device 102, the service server 104, and the device 105 via the communication unit 301.

The service server 104 is provided with a communication control unit 303 and a setting management unit 304. The communication control unit 303 is a function for performing reception of the subscribe message and transmission of the publish message in the MQTT. The setting management unit 304 is also a function for managing acceptance of a request issued via a setting screen of the client device 102 and setting information for displaying an execution result screen by the client device 102 via the communication control unit 303.

The device 105 is provided with the Web browser 305, a local login unit 306, an authentication server coordination unit 307, and a function calling control unit 308. The Web browser 305 is a function for performing communications with the authentication server 103 and the service server 104. The local login unit 306 is a function for authenticating the local user who is the user of the device 105. It should be noted that the local login unit 306 can also be configured so as to be able to authenticate the local user by communicating with an authentication server which is not illustrated in the drawing.

The authentication server coordination unit 307 performs issuance request of authentication coordination information. The authentication server coordination unit 307 is also a function of associating cloud user authentication information corresponding to information for uniquely identifying the cloud user who is a user of the cloud system 106 and local user authentication information corresponding to information for uniquely identifying the local user with each other.

The authentication coordination information refers to authentication information used for associating the cloud user authentication information and the local user authentication information with each other. Examples of the authentication coordination information include a pass code and the like. The cloud user authentication information is a collective term of authentication information generated when the cloud user logs in to the cloud system 106 and includes information for uniquely identifying the cloud user such as a cloud user ID and a cloud user universally unique identifier (UUID). The UUID refers to an identifier for uniquely identifying the user and is created while it is assumed that the identifier is not duplicated with those of the other users unlike an ID. That is, when cloud user UUIDs are used, it is possible to identify all of user information set for each tenant in a multi-tenant system. In an example which will be described below, a mode of a token is used as the cloud user authentication information for the explanation, but any mode may also be adopted as long as the information can be used to identify the cloud user. On the other hand, the local user authentication information refers to a collective term of authentication information generated when the local user logs in to the device 105 and includes information for uniquely identifying the local user such as a local user ID or a local user UUID. In the example which will be described below, a mode of a token is used as the local user authentication information for the explanation, but any mode may also be adopted as long as the information can be used to identify the local user. Association information in which the cloud user UUID and the local user UUID are associated with each other by using the authentication coordination information will be described below as an example.

The function calling control unit 308 transmits the subscribe message to the service server 104 in the user association processing for associating the cloud user UUID and the local user UUID with each other and waits for a processing request from the service server 104.

Figure 4:
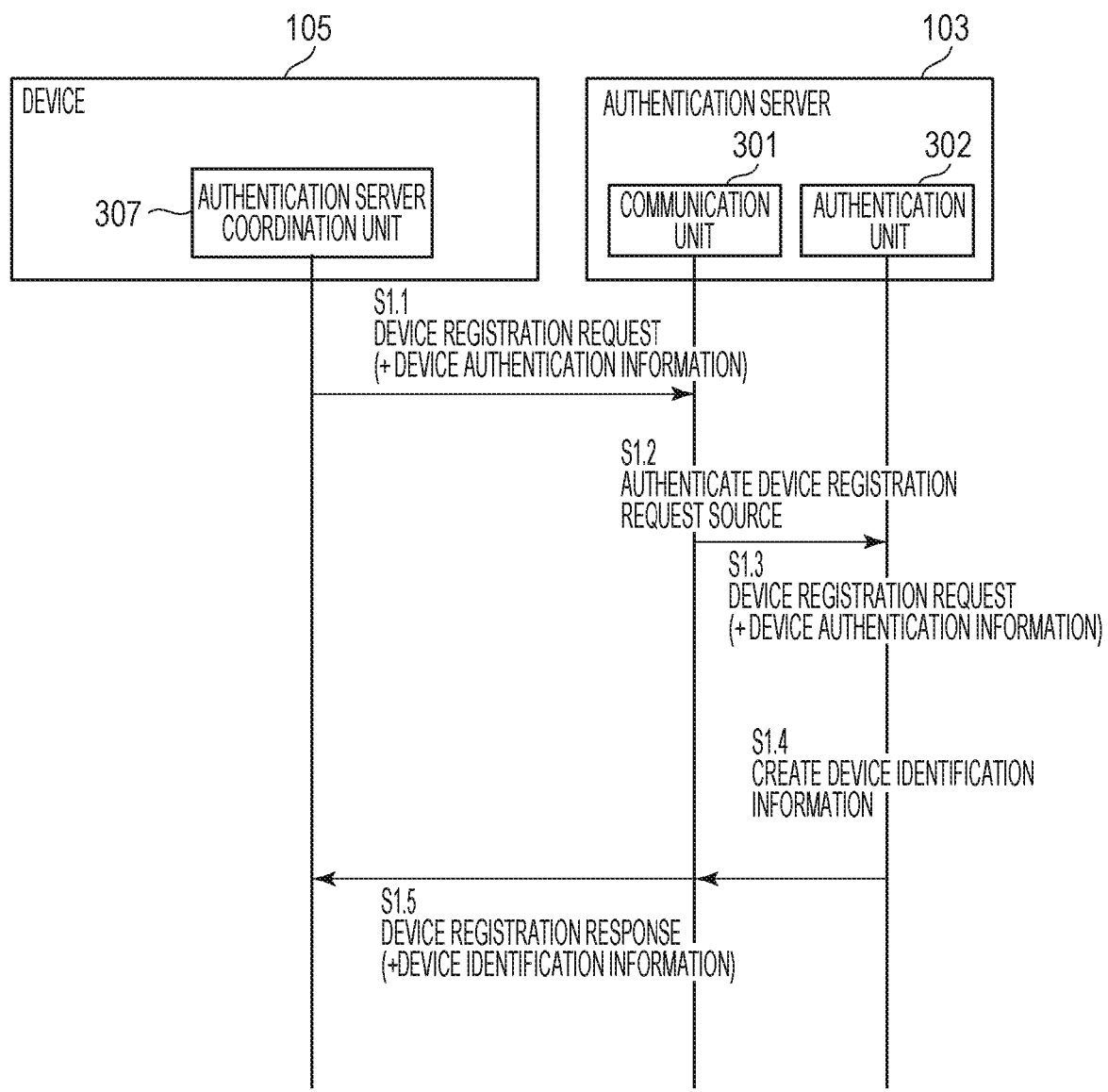
FIG. 4 is a sequence diagram illustrating a procedure for an authentication server to authenticate a device according to an exemplary embodiment of the present disclosure.

A procedure for the authentication server 103 to authenticate the device 105 will be described with reference to FIG. 4. This procedure is started at a timing when the authentication server coordination unit 307 is activated for the first time after the authentication server coordination unit 307 is installed in the device 105. The communication unit 301 of the authentication server 103 is configured to need the authentication of the device 105.

The authentication server coordination unit 307 transmits a device registration request to the communication unit 301 (S1.1). The communication unit 301 that has received the device registration request from the authentication server coordination unit 307 starts SSL/TLS communication negotiation. At this time, the communication unit 301 requests the authentication server coordination unit 307 for device authentication information. The device authentication information refers to a certificate used for the SSL/TLS communication to specify the device 105. The communication unit 301 uses the certificate set in a certificate store which is not illustrated in the drawings to verify the device authentication information obtained in S1.1 and authenticates that the authentication server coordination unit 307 is a registration request source of the device 105 (S1.2). The communication unit 301 transmits the device registration request and the device authentication information received from the authentication server coordination unit 307 to the authentication unit 302 (S1.3). The authentication unit 302 issues device identification information for uniquely identifying the device 105 on the basis of the device authentication information obtained in S1.3 (S1.4). According to the subsequent exemplary embodiment, the descriptions are provided while it is assumed that the device identification information has a mode of the certificate, but the device identification information may take not only the mode of the certificate but also a mode of numeric values and character strings and the like as long as the authentication unit 302 can uniquely identify the device 105. The authentication unit 302 transmits the device identification information to the authentication server coordination unit 307 via the communication unit 301 as a response with respect to the device registration request (S1.5).

The procedure for the authentication server 103 to authenticate the device 105 has been described above. With this procedure, when the device identification information issued by the authentication unit 302 is used, it becomes possible for the authentication server coordination unit 307 to specify the device 105. In addition, registration processing for registering the authentication server coordination unit 307 in the authentication unit 302 is performed as a preliminary setting of the present exemplary embodiment, but the preliminary setting is not necessarily limited to the above-described processing. For example, the device identification information issued by the authentication unit 302 may be manually registered in the authentication server coordination unit 307. The device authentication information embedded in the authentication server coordination unit 307 at the time of shipment may also be used as it is. In addition, according to the subsequent exemplary embodiment, a "communication with respect to the authentication unit 302 from the outside via the communication unit 301" will be described as a "communication with respect to the authentication unit 302 from the outside".

First Exemplary Embodiment

Figure 5:
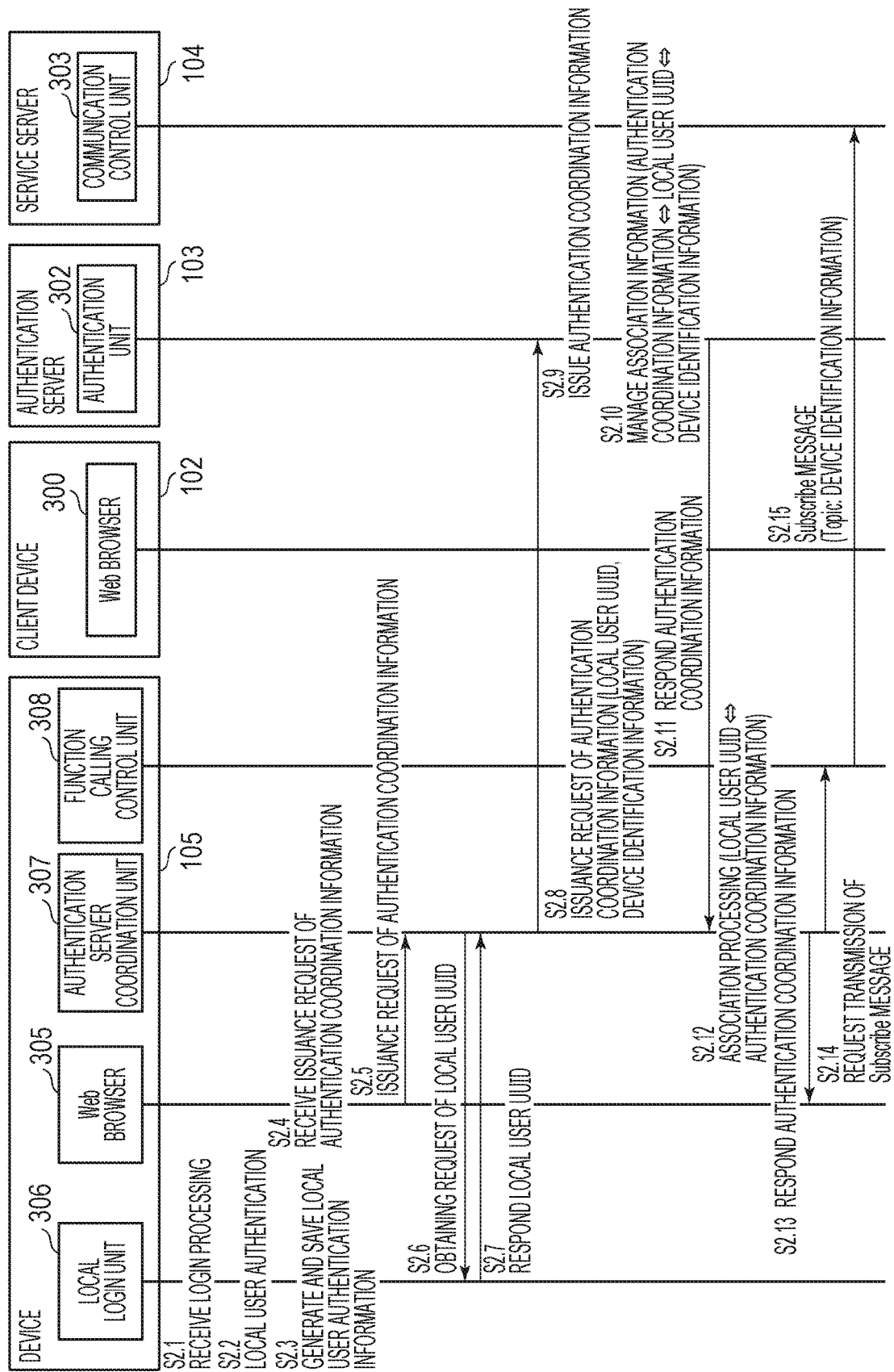
FIG. 5 is a sequence diagram illustrating a procedure for issuing authentication coordination information according to an exemplary embodiment of the present disclosure.

In a case where the device 105 is the multi-user device, association of a plurality of cloud user UUIDs with the local user UUID is permitted. A mode in which the cloud system 106 specifies a cloud user UUID to which the execution result corresponds, and the request and the response are associated with each other will be described according to a first exemplary embodiment. A procedure for issuing the authentication coordination information for associating the cloud user UUID managed by the authentication unit 302 and the local user UUID managed by the local login unit 306 with each other in a state in which the registration processing of the device 105 has been performed (FIG. 4) will be described with reference to FIG. 5.

In S2.1, the local login unit 306 receives login processing of the user on the basis of an authentication method determined by the local login unit 306. For example, the authentication method includes a method of verifying a user ID and a password, a method of verifying biological information such as a fingerprint, a method of using a contactless type IC card, and furthermore, a multi-element authentication method of using a plurality of authentication methods in combination and the like. In addition, a configuration can be adopted in which the user is authenticated by communicating with the authentication server which is not illustrated in the drawing. According to the first exemplary embodiment, the descriptions will be provided while a case where the authentication method of verifying the combination of the local user ID and the password is used as an example. Table 1 illustrates an example of the user information managed by the local login unit 306.

TABLE 1

| Local user ID | Local user UUID | Password | Authority information |
|---|---|---|---|
| admin | AAA1 | admin | administrator |
| user | AAA2 | user | general |

In S2.2, the local login unit 306 performs the local user authentication by using the combination of the local user ID and the password. Specifically, the local login unit 306 refers to the user information in Table 1 and performs the local user authentication. For example, in a case where the user inputs the local user ID "admin" and the password "admin", the local login unit 306 verifies the user as the local user having the local user ID "admin".

In S2.3, the local login unit 306 generates and saves the local user authentication information of the user authenticated in S2.2. This local user authentication information is saved in an effective state until the user executes a logout operation which is not illustrated in the drawings or a set time has elapsed. The local user authentication information stores the local user ID, the local user UUID, authority information, and the like of the authenticated user. That is, the local user authentication information includes substantially the same information as the user information illustrated in Table 1. It should be noted that the configuration is not limited to the mode in which the local login unit 306 directly stores the local user authentication information. A mode may also be adopted in which the token associated with the local user authentication information is stored in the local login unit 306, and the local user authentication information stored in a location different from the local login unit 306 is used by referring to the token.

In S2.4, the Web browser 305 accepts the issuance request of the authentication coordination information through the operation by the user. The Web browser 305 transmits the issuance request of the authentication coordination information to the authentication server coordination unit 307 in accordance with the received issuance request (S2.5). In S2.6, the authentication server coordination unit 307 performs an obtaining request of the local user UUID with respect to the local login unit 306. The local login unit 306 responds the local user UUID to the authentication server coordination unit 307 with respect to the request in S2.6 (S2.7). In S2.8, the authentication server coordination unit 307 transmits the issuance request of the authentication coordination information to the authentication unit 302. At this time, the local user UUID received in S2.7 and the device identification information received in S1.5 are transmitted to the authentication unit 302.

In S2.9, the authentication unit 302 issues the authentication coordination information. The issued authentication coordination information and its effective period are illustrated in Table 2. According to the first exemplary embodiment, the authentication coordination information is constituted by a character string, but as will be described below, information having a mode of a QR code (registered trademark) or the like may also be used. In addition, the effective period is set for the authentication coordination information according to the first exemplary embodiment, but the authentication coordination information having an indefinite effective period may also be used.

TABLE 2

| Authentication coordination information | Effective period |
|---|---|
| XXX-YYY-ZZZ | 12/06/2016 08:00:00 |
| AAA-BBB-CCC | 11/06/2016 07:00:00 |

In S2.10, the authentication unit 302 manages association information in which the authentication coordination information issued in S2.9 and the local user UUID and the device identification information received in S2.8 are associated with one another. An example of the association information illustrated in Table 3.

TABLE 3

| Device identification information | Local user UUID | Authentication coordination information |
|---|---|---|
| 00001 | AAA1 | XXX-YYY-ZZZ |

In S2.11, the authentication unit 302 responds the authentication coordination information with respect to the authentication server coordination unit 307. The authentication server coordination unit 307 associates the local user UUID and the authentication coordination information received in S2.11 with each other (S2.12). An example of a mapping table generated at this time is illustrated in Table 4.

TABLE 4

| Local user UUID | Authentication coordination information |
|---|---|
| AAA1 | XXX-YYY-ZZZ |

In S2.13, a response is made with respect to the issuance request of the authentication coordination information in S2.5. Specifically, the authentication coordination information responded in S2.11 is transmitted to the Web browser 305, and the Web browser 305 displays the authentication coordination information. With this configuration, the user can obtain the authentication coordination information. In S2.14, the transmission of the subscribe message is requested. Specifically, to perform the user association processing which will be described below, the authentication server coordination unit 307 requests the function calling control unit 308 for the transmission of the subscribe message to the communication control unit 303. In S2.15, the function calling control unit 308 transmits the subscribe message to the communication control unit 303. The topic of the subscribe message is specified by the device identification information. Specifically, the topic has a hierarchical structure separated by "/" (for example: /A/BC/D/E), and a category of the information that the subscriber desires to receive can be defined. Therefore, for example, the transmission destination of the message is specified as in "(location where the device 105 is installed)/(device identification information)". With this configuration, the publish message in which the device identification information of the device 105 is set as the topic can be received by the function calling control unit 308. The function calling control unit 308 also transmits the subscribe message to the communication control unit 303 to maintain the communication with the communication control unit 303 each time when the disconnection of the communication is detected.

The procedure for issuing the authentication coordination information has been described above. With this configuration, the authentication server 103 and the device 105 can own the mapping tables (Table 3 and Table 4) using the authentication coordination information. The user can also obtain the authentication coordination information.

Figure 6:
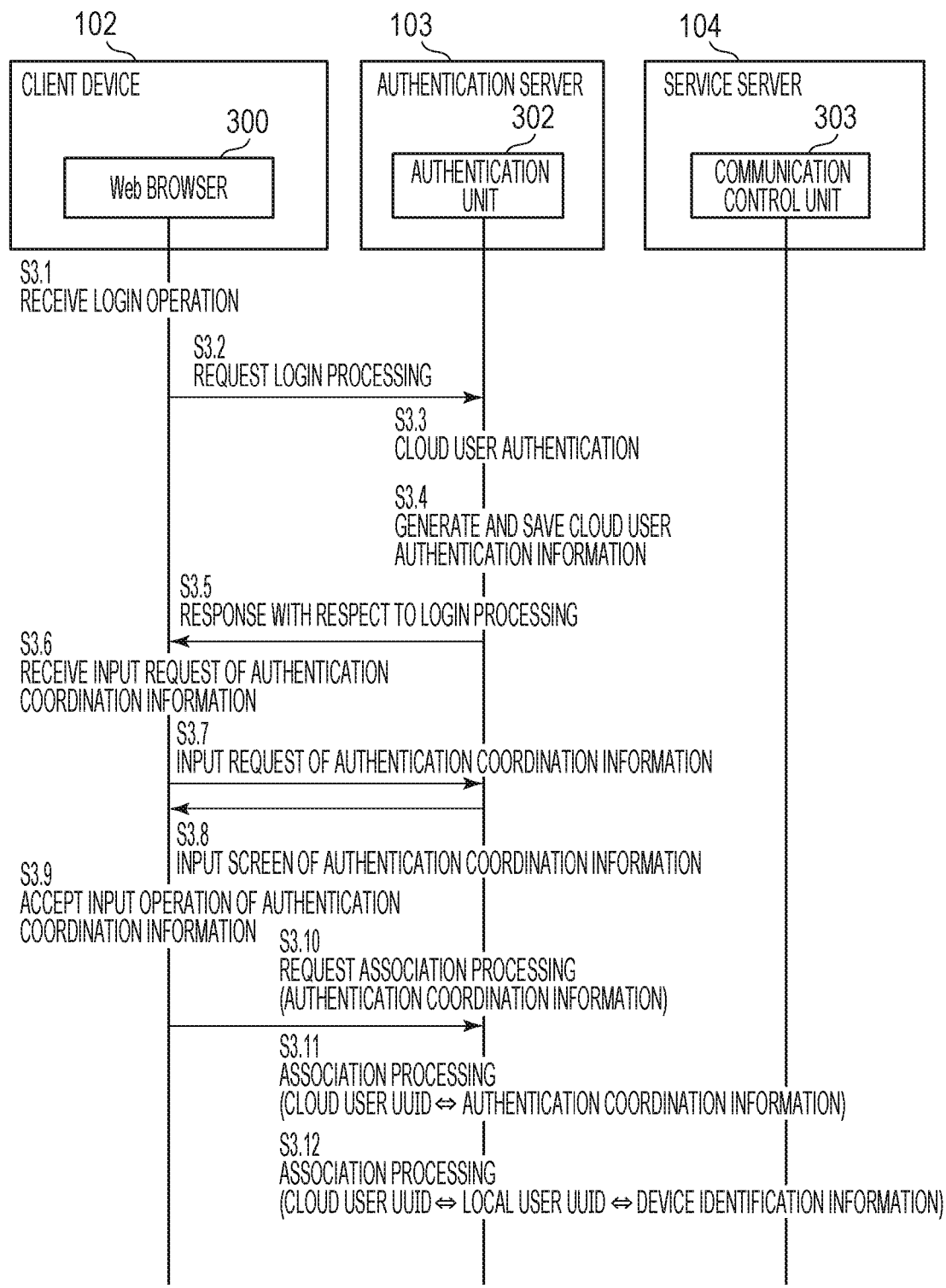
FIG. 6 is a sequence diagram illustrating user association processing for associating a local user UUID and a cloud user UUID with each other in the authentication server according to an exemplary embodiment of the present disclosure.

Next, the user association processing for associating the local user UUID and the cloud user UUID with each other in the authentication server 103 will be described with reference to FIG. 6. In S3.1, the Web browser 300 accepts the login operation from the user and the Web browser 300 requests the authentication unit 302 for the login processing in S3.2. This login processing is performed by the authentication method determined in the authentication unit 302. For example, the authentication method includes a method using a method of verifying the combination of the user ID and the password and the like. According to the first exemplary embodiment, the combination of the cloud user ID and the password will be described as an example. Table 5 illustrates an example of the user information managed by the authentication unit 302.

TABLE 5

| Cloud user ID | Cloud user UUID | Password |
|---|---|---|
| se001 | CCC1 | se001 |
| se002 | CCC2 | se002 |

In S3.3, the authentication unit 302 performs the cloud user authentication and generates and saves the cloud user authentication information of the cloud user authenticated in S3.4. The cloud user authentication information is saved in an effective state until the user executes the logout operation which is not illustrated in the drawings or a set time has elapsed. The cloud user authentication information stores the cloud user ID and the cloud user UUID of the authenticated cloud user. That is, the cloud user authentication information includes substantially the same information as the user information illustrated in Table 5. It should be noted that not only the mode is used in which the authentication unit 302 directly stores each authentication information, but also a mode may be adopted in which the authentication unit 302 stores the token associated such that each authentication information can be referred to, and the authentication information stored in a location different from the authentication unit 302 is used by referring to the token.

In S3.5, the authentication unit 302 makes the response to the Web browser 300 with respect to the login processing. At this time, a session ID associated with the cloud user UUID generated in S3.4 is transmitted to the Web browser 300. The session ID refers to an identifier for identifying the logged-in user, and according to the present exemplary embodiment, the session ID is associated with the cloud user UUID generated in S3.4 and managed by the authentication unit 302. In S3.5, when the session ID is received by the Web browser 300, the session ID is managed in Cookie (not illustrated) of the Web browser 300. According to the exemplary embodiments which will be described below, transmission and reception of this session ID are performed in the communication between the Web browser 300 and the authentication unit 302 unless particularly mentioned.

In S3.6, the Web browser 300 receives the input request of the authentication coordination information from the user, and the Web browser 300 performs the input request of the authentication coordination information with respect to the authentication unit 302 in S3.7. The authentication unit 302 responds the input screen with respect to the input request of the authentication coordination information from the Web browser 300 (S3.8). In S3.9, the Web browser 300 accepts the input operation of the authentication coordination information by the user. In S3.10, the Web browser 300 transmits the accepted authentication coordination information to the authentication unit 302 and requests the association processing using the authentication coordination information. In S3.11, the authentication coordination information and the cloud user UUID managed by the authentication unit 302 are associated with each other. Specifically, the cloud user UUID managed by the authentication unit 302 and the session ID received in S3.10 are collated, and the cloud user UUID and the authentication coordination information are associated with each other via the session ID. An example of the association information generated at this time is illustrated in Table 6.

TABLE 6

| Cloud user UUID | Authentication coordination information |
|---|---|
| CCC1 | XXX-YYY-ZZZ |

In S3.12, the authentication unit 302 holds the mapping table created in S2.10 (Table 3) and the mapping table created in S3.11 (Table 6) together into a single mapping table to associate the local user UUID and the cloud user UUID with each other. Specifically, since the authentication coordination information common in Table 3 and Table 6 exists, the local user UUID and the cloud user UUID are associated with each other via the above-described authentication coordination information. An example of the mapping table at this time is illustrated in Table 7. The association information in Table 7 is also associated with the session ID received in S3.10.

TABLE 7

| Device identification information | Local user UUID | Cloud user UUID |
|---|---|---|
| 00001 | AAA1 | CCC1 |

The user association processing for associating the local user UUID and the cloud user UUID with each other in the authentication server 103 has been described above. In a case where the authentication coordination information reaches the end of the effective period to be invalidated when the mapping table as illustrated in Table 7 is created, the mapping table creation fails, and this user association processing is ended. At this time, the Web browser 300 may be notified that the mapping table creation fails.

Figure 7:
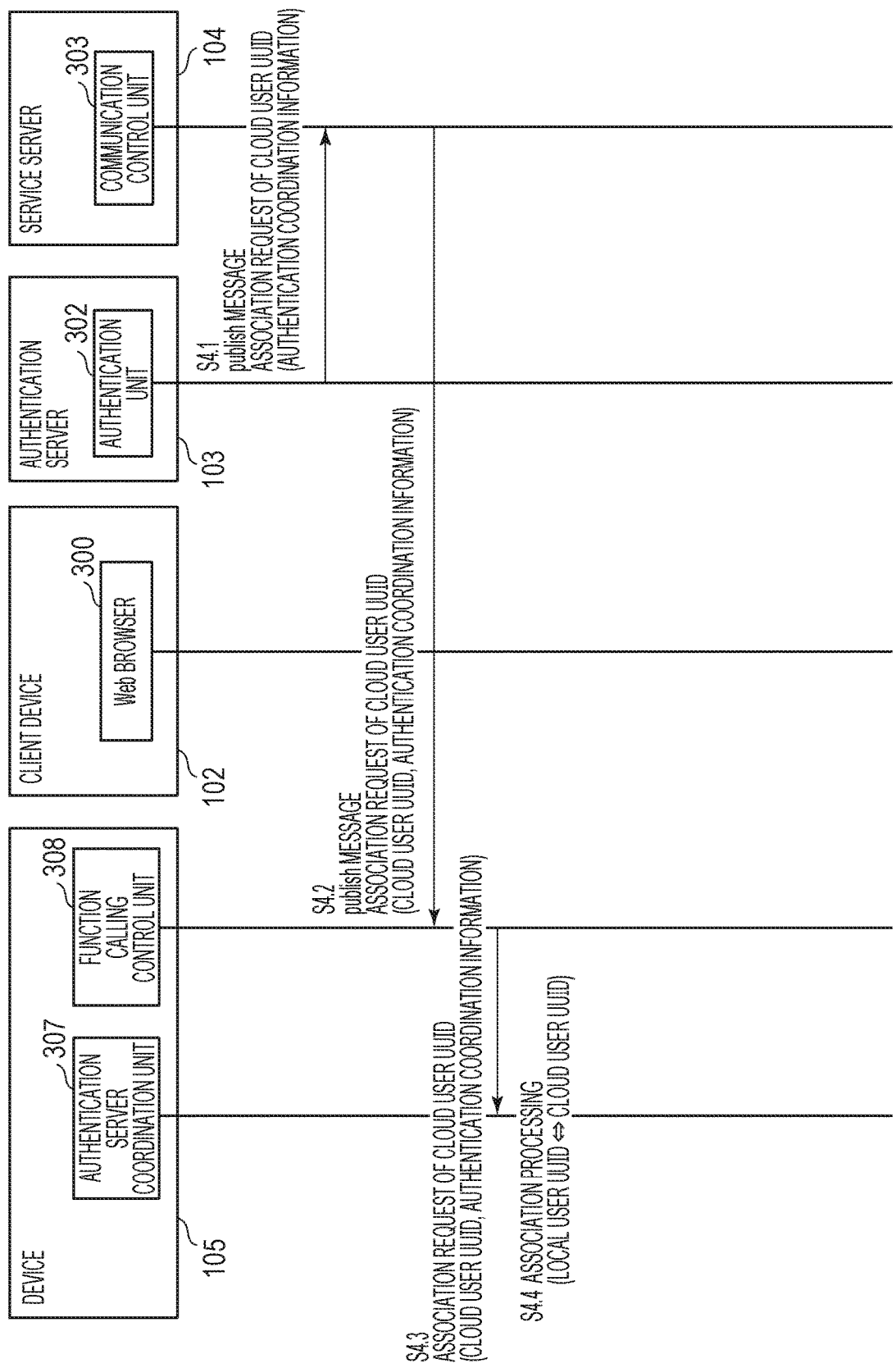
FIG. 7 is a sequence diagram illustrating the user association processing for associating the local user UUID and the cloud user UUID with each other in the device according to an exemplary embodiment of the present disclosure.

Next, the user association processing for associating the local user UUID and the cloud user UUID with each other in the device 105 will be described with reference to FIG. 7. In S4.1, the association request of the cloud user UUID is transmitted. Specifically, the authentication unit 302 transmits the publish message together with the authentication coordination information input in S3.9 to the communication control unit 303. The topic when the publish message is transmitted is set as the device identification information. With this configuration, it is possible to transmit the publish message having the same topic as the subscribe message transmitted by the function calling control unit 308 in S2.15 (the topic is the device identification information of the device 105). The message transmitted by the authentication unit 302 does not need to be the publish message of the MQTT if the communication control unit 303 is provided with a conversion function of the MQTT and the other protocol.

In S4.2, the association request of the cloud user UUID is transmitted. Specifically, the publish message is transmitted as the association request of the cloud user UUID to the function calling control unit 308 that has transmitted the subscribe message. At this time, the cloud user UUID and the authentication coordination information are also transmitted. Since the subscribe message has the same topic as the publish message received in S4.1, the publish message is transmitted to the function calling control unit 308. In S4.3, the function calling control unit 308 performs the association request of the cloud user UUID with respect to the authentication server coordination unit 307. At this time, the notification of the authentication coordination information and the cloud user UUID received in S4.2 is also performed at the time. In S4.4, the association processing between the local user UUID and the cloud user UUID is performed by using the cloud user UUID and the authentication coordination information received by the authentication server coordination unit 307 in S4.3. Since the local user UUID and the authentication coordination information are associated with each other in S2.12 in the authentication server coordination unit 307, it is possible to associate the local user UUID and the cloud user UUID with each other via the authentication coordination information. The mapping table generated in S4.4 is illustrated in Table 8.

TABLE 8

| Local user UUID | Cloud user UUID |
|---|---|
| AAA1 | CCC1 |

The user association processing for associating the local user UUID and the cloud user UUID with each other in the device 105 has been described above. As a result of the user association processing of FIG. 6, the local user UUID and the cloud user UUID are associated with each other in the authentication server 103. As a result of the user association processing illustrated in FIG. 7, the local user UUID and the cloud user UUID are associated with each other in the device 105.

Figure 8:
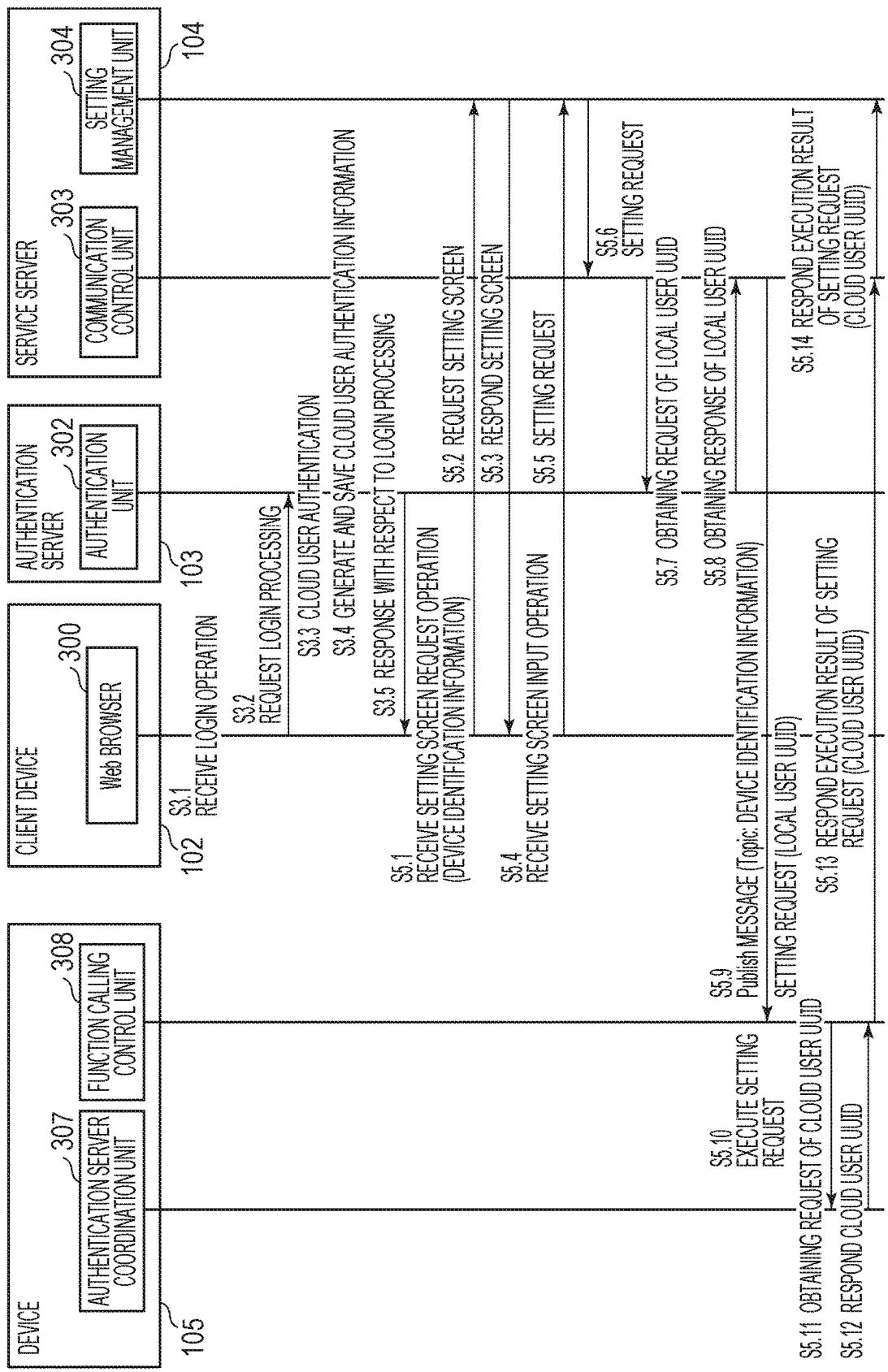
FIG. 8 is a sequence diagram illustrating function calling processing in the device according to an exemplary embodiment of the present disclosure.

Next, function calling processing in the device 105 will be described with reference to FIG. 8. In this case, the function calling processing will be described while the setting of the device 105 is used as an example, but the execution request or the like for using the function of the device 105 other than the setting request is also conceivable. According to the first exemplary embodiment, the same steps as the already explained steps are assigned with the same step numbers, and the detailed descriptions will be omitted. The same also applies to the other exemplary embodiments.

In S5.1, the Web browser 300 receives the request of the setting screen from the user. At this time, the device identification information is also received at the same time. In S5.2, the Web browser 300 requests the setting management unit 304 for the setting screen, and the setting management unit 304 makes a response to the request in S5.3. In a case where a communication protocol between the Web browser 300 and the service server 104 is Hypertext Transfer Protocol (HTTP) at this time, the setting request transmitted from the Web browser 300 in S5.2 is a request message in conformity to the HTTP method. The same also applies to the subsequent exchanges between the Web browser 300 and the service server 104. An example of the setting screen responded by the setting management unit 304 is illustrated in FIG. 9. The setting screen of FIG. 9 includes the device identification information, a setting item table, and an input completion button. A setting value to be newly set in a setting value is input to a setting value column in the setting item table. Furthermore, when the operation by the user presses the input completion button on the setting screen, step S5.5 which will be described below is started.

In S5.4, the Web browser 300 receives the setting information input operation from the user. Specifically, the Web browser 300 receives an input operation of the setting information on the displayed setting screen (FIG. 9), and the "input complete" button is pressed. At this time, the user inputs "5 minutes" in a "setting value" field in an "auto sleep transit time", and the setting information is received by the Web browser 300. The auto sleep transit time refers to a time until auto sleep (in which the active device 105 stops to suppress power consumption when no operation is performed by the user for a predetermined period of time) occurs. In S5.5, the Web browser 300 transmits the setting request to the setting management unit 304. At this time, the Web browser 300 transmits the session ID received in S3.5 to the setting management unit 304. Specifically, the setting request for setting the auto sleep transit time as 5 minutes is transmitted to the setting management unit 304.

In S5.6, the setting management unit 304 transmits the setting request received from the Web browser 300 to the communication control unit 303. At this time, the device identification information specified in S5.1 by the user is also transmitted. In S5.7, the communication control unit 303 performs the obtaining request of the local user UUID with respect to the authentication unit 302. At this time, the session ID is transmitted to the authentication unit 302 together with the obtaining request of the local user UUID. The local user UUID associated with the session ID received from the communication control unit 303 can be identified by using the local user UUID and the cloud user UUID associated with each other in the authentication unit 302 and the association information with the session ID (Table 7), and the local user UUID to be transmitted with respect to the obtaining request from the communication control unit 303 can be specified. In S5.8, when the authentication unit 302 transmits the local user UUID to the communication control unit 303, the obtaining response of the local user UUID is performed.

In S5.9, the communication control unit 303 transmits the local user UUID obtained in S5.8 and the setting request received in S5.6 to the function calling control unit 308. Specifically, the setting request for setting the auto sleep transit time as 5 minutes is transmitted to the function calling control unit 308. According to the first exemplary embodiment, since the case where the service server 104 is a server that performs a message communication based on the MQTT has been described as an example, the publish message is transmitted as the setting request to the function calling control unit 308. The topic at this time is the device identification information. With this configuration, it is possible to transmit the publish message having the same topic as the subscribe message transmitted by the function calling control unit 308 in S2.15 (the topic is the device identification information of the device 105).

In S5.10, the function calling control unit 308 executes the setting request in accordance with the contents of the publish message received in S5.9. At this time, the setting request is executed as the local user identified by the local user UUID received together with the setting request. Specifically, in a case where the function calling control unit 308 receives a local user UUID "AAA1", the auto sleep transit time is set as 5 minutes as the local user ID "admin" on the basis of the user information that the device 105 has (Table 1).

In S5.11, the function calling control unit 308 performs the obtaining request of the cloud user UUID which is associated with the local user UUID received from the communication control unit 303 with respect to the authentication server coordination unit 307. In S5.12, the cloud user UUID associated with the local user UUID is responded to the function calling control unit 308 by using the mapping table managed by the authentication server coordination unit 307 (Table 8). In S5.13, the function calling control unit 308 responds the execution result with respect to the communication control unit 303 together with the cloud user UUID obtained in S5.12. Herein, a reason why the cloud user UUID is transmitted together with the execution result is that the cloud user UUID for the unique identification in the communication control unit 303 is to be transmitted since a plurality of cloud user UUIDs may be associated with a single local user UUID in the communication control unit 303 in some cases.

According to the first exemplary embodiment, the description has been provided by using the example in which the setting change of the device 105 for setting the "auto sleep transit time as 5 minutes" is received from the Web browser 300 as the setting request, and therefore, the response of the execution result in S5.13 includes a value after the setting change. In a case where the device 105 includes a printing function such as a multi-functional peripheral (MFP), use of the printing function or the like is also considerable as the setting request. In this case, status information is transmitted to the communication control unit 303 as a result response, for example, and the information included in the response of the execution result varies in accordance with contents of the setting request. When the setting of the device 105 fails or execution of the function fails, the execution result to be responded includes information related to the error.

In S5.14, the communication control unit 303 transmits the execution result of the setting request to the setting management unit 304 together with the cloud user UUID. When the setting management unit 304 uses the cloud user UUID received in S5.14, it is possible to identify a cloud user having the setting request to which the result has been responded. In addition, when the setting management unit 304 obtains the local user UUID associated with the cloud user UUID from the authentication unit 302, it is possible to identify a local user having the setting request to which the result has been responded. The execution result and the local user UUID and the cloud user UUID used when the execution is performed are eventually managed by the setting management unit 304.

The function calling processing in the device 105 has been described above. With this configuration, the user can use the function made public by the device 105 via the Web browser 300 of the client device 102, and it is possible to check the execution result based on the use of the function.

After the function of the device 105 is executed, the Web browser 300 of the client device 102 can receive a request made on the execution result screen which is not illustrated in the drawings from the user and display the execution result screen. An example of the execution result screen is illustrated in FIG. 10. In FIG. 10, the device identification information of the device 105 that has performed the setting change and values before and after the setting change are stored. In addition, it is possible to store a setting change status with respect to each of the setting items.

Figure 12:
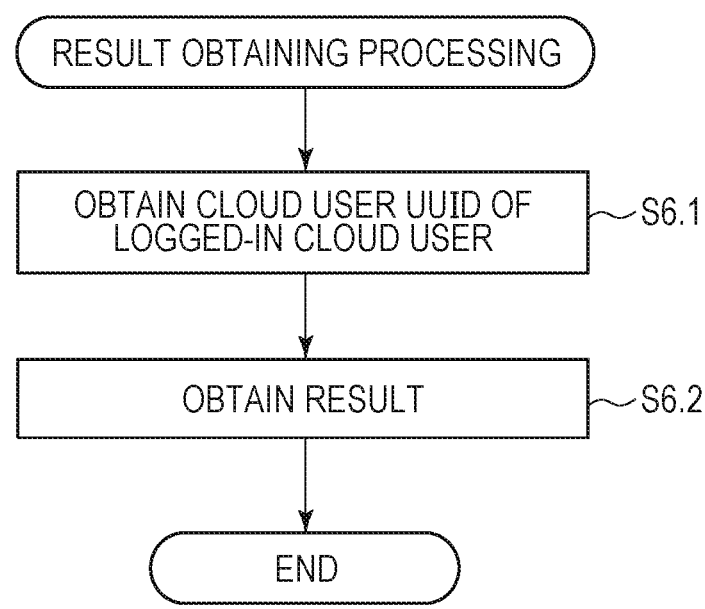
FIG. 12 is a flow chart of result obtaining processing according to an exemplary embodiment of the present disclosure.

An example of a flow of result obtaining processing for displaying the execution result screen is illustrated in FIG. 12. Activation of the present flow is performed when the user requests for the execution result screen. At this time, the device identification information of the device 105 for requesting the execution result and response identification information are selected by the Web browser 300. An example of an execution result selection screen displayed on the Web browser 300 when the selection is performed is illustrated in FIG. 11. A link exists with respect to each item in the field of "content outline" in FIG. 11, and the response identification information is selected when the link is selected to request for the execution result screen. In addition, according to the first exemplary embodiment, since the request and the response is not directly associated, the request and the response are described while being separated from each other in FIG. 11, but the configuration is not limited to this mode. It is also possible to manage an execution history of the cloud user on the execution result selection screen. After the device identification information and the response identification information are selected on the screen of FIG. 11, the setting management unit 304 obtains the cloud user UUID of the logged-in cloud user from the authentication unit 302 in S6.1. In S6.2, the setting management unit 304 obtains information related to the execution result of the device 105 from database that stores the information which is not illustrated in the drawings by using the cloud user UUID obtained in S6.1 and the selected device identification information and the response identification information.

The flow of the result obtaining processing for displaying the execution result screen has been described above. With this configuration, it is possible to refer to the execution result of the device 105 with respect to the request that has been requested by the user itself. The flow of the result obtaining processing is not limited to the mode illustrated in FIG. 11 or FIG. 12. For example, a mode is also conceivable in which the user does not perform the selection of the request at the time of the result screen request, and only latest information is browsed from the execution results thus far. In addition, it is conceivable that the execution result screen is created when the setting management unit 304 obtains the execution result in S5.14 instead of the obtainment of the execution result in accordance with the execution result screen request of the user.

Second Exemplary Embodiment

When the local user UUID that the device 105 has and the cloud user UUID that the authentication server 103 has are leaked, there is a possibility that impersonation of the user may be performed. For this reason, a common key is issued in the user association processing, and signature information is assigned in the function calling processing, so that it is possible to detect tampering of the setting request to the device 105. For example, in a case where the setting request to the device 105 is the setting request for "setting the auto sleep transit time as 5 minutes", the tampering of the setting request is performed in a manner that the setting request is tampered to "setting the auto sleep transit time as 1 minute" or the like, and the setting request unintended by the user is executed in the device 105. According to a second exemplary embodiment, the user association processing and the function calling processing in a case where the common key is used will be described. Detailed descriptions on similar steps in the user association processing (FIG. 6 and FIG. 7) and the function calling processing (FIG. 8) according to the first exemplary embodiment will be omitted.

First, the user association processing for associating the local user UUID and the cloud user UUID with each other in the authentication server 103 in a case where the common key is used will be described with reference to FIG. 6. When S3.11 is replaced with S7.1 and S3.12 is replaced with S7.2 which will be described below, the user association processing in a case where the common key is used is realized.

The Web browser 300 receives the input request of the authentication coordination information from the user (S3.6) and performs the input request of the authentication coordination information with respect to the authentication unit 302 (S3.7). The authentication unit 302 responds the input screen of the authentication coordination information with respect to the input request in S3.7 (S3.8). The Web browser 300 accepts the input operation of the authentication coordination information from the user by using the responded input screen (S3.9) and requests the authentication unit 302 for the association processing (S3.10). In S7.1, the association processing between the cloud user UUID and the authentication coordination information is performed in the authentication unit 302, and the common key with respect to the association information is issued. The authentication unit 302 associates the association information among the cloud user UUID, the local user UUID, and the device identification information (Table 7) and the common key with each other by using the common key issued in S7.1 (S7.2).

The user association processing for associating the local user UUID and the cloud user UUID with each other in the authentication server 103 in a case where the common key is used has been described above. With this configuration, the authentication unit 302 can hold the common key associated with the local user UUID and the cloud user UUID.

Figure 13:
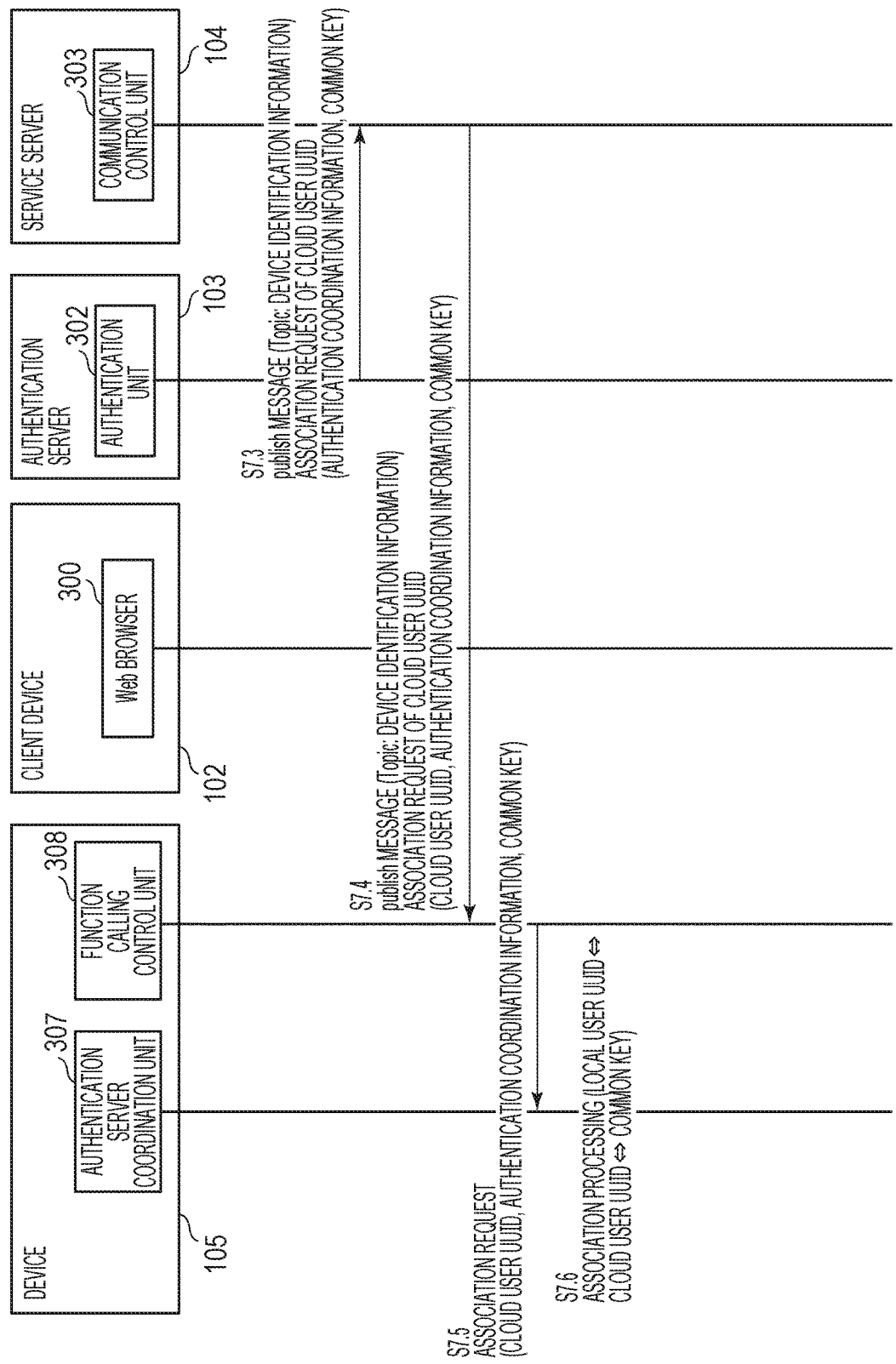
FIG. 13 is a sequence diagram illustrating the user association processing for associating the local user UUID and the cloud user UUID with each other in the device in a case where a common key is used according to an exemplary embodiment of the present disclosure.

Next, the user association processing between the local user UUID and the cloud user UUID in the device 105 in a case where the common key is used will be described with reference to FIG. 13. In S7.3, the association request among the authentication coordination information, the cloud user UUID, and the common key is transmitted. Specifically, the authentication unit 302 transmits the publish message to the communication control unit 303 together with the authentication coordination information input in S3.9 and the common key issued in S7.1. The topic when the publish message is transmitted is set as the device identification information. With this configuration, it is possible to transmit the publish message having the same topic as the subscribe message transmitted in S2.15 by the function calling control unit 308 (the topic is the device identification information of the device 105). At this time, the message transmitted by the authentication unit 302 does not need to be the publish message of the MQTT if the communication control unit 303 is provided with a conversion function of the MQTT and the other protocol.

In S7.4, the association request between the cloud user UUID and the common key is transmitted. In this case, the publish message is transmitted to the function calling control unit 308 that has transmitted the subscribe message as the association request of the cloud user UUID. The cloud user UUID, the authentication coordination information, and the common key are transmitted together with the message. With respect to the subscribe message, since the topic is the same as the publish message received in S7.3, the publish message is transmitted to the function calling control unit 308. In S7.5, the function calling control unit 308 performs the association request of the cloud user UUID with respect to the authentication server coordination unit 307. At this time, the notification of the authentication coordination information, the cloud user UUID, and the common key received in S7.4 is also simultaneously performed. In S7.6, the association processing for associating the local user UUID and the cloud user UUID and the common key with each other is performed. Specifically, the association processing is performed by using the cloud user UUID, the authentication coordination information, and the common key received by the authentication server coordination unit 307 in S4.3.

The user association processing for associating the local user UUID and the cloud user UUID with each other in the device 105 in a case where the common key is used has been described above. With this configuration, the authentication server coordination unit 307 can hold the common key associated with the local user UUID and the cloud user UUID.

In the above-described contents, key exchange is performed on the premise of the common key base of a symmetric-key cryptography. However, the configuration is not limited to this. For example, a public key base of an asymmetric-key cryptography may also be used. In this case, an asymmetric key pair (a public key and a private key) is issued in S7.1 in the authentication unit 302, and the public key is transmitted to the function calling control unit 308 in S7.4. Thereafter, furthermore, it is conceivable that the asymmetric key pair is issued in the authentication server coordination unit 307, and the public key is transmitted to the authentication unit 302. In a case where the device 105 does not include the key issuance function, the authentication unit 302 may issue the two the asymmetric key pairs instead.

Figure 14:
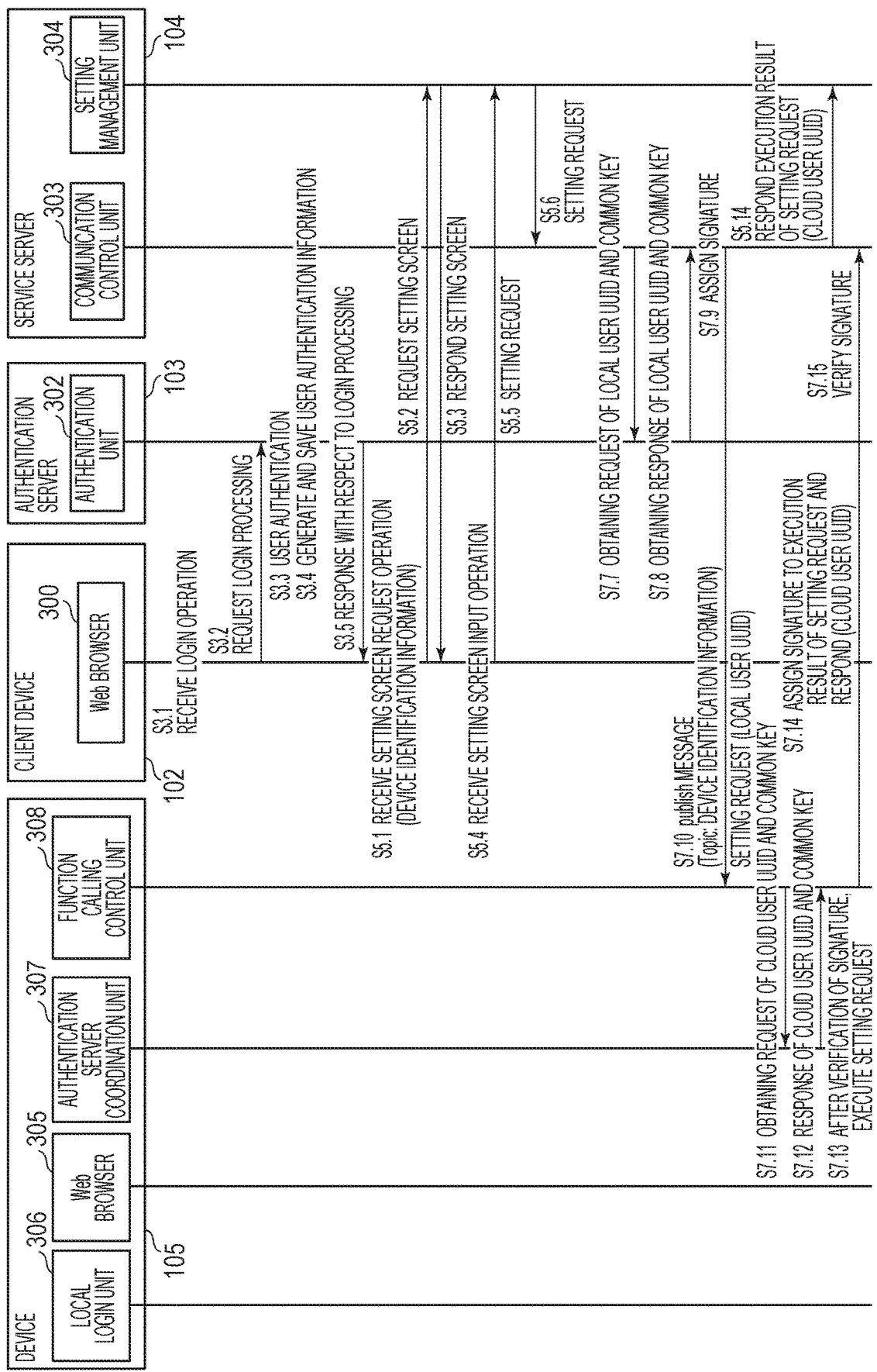
FIG. 14 is a sequence diagram illustrating the function calling processing in the device in a case where the common key is used according to an exemplary embodiment of the present disclosure.

Next, the function calling processing in a case where the common key is used will be described with reference to FIG. 14. The same steps as those in the function calling processing of FIG. 8 are assigned with the same step numbers, and the detailed descriptions will be omitted. In S5.1, the Web browser 300 receives a setting screen request operation from the user together with the device identification information. The Web browser 300 requests the setting management unit 304 for the setting screen in accordance with the received setting screen request operation (S5.2), and the setting management unit 304 responds the setting screen to the Web browser 300 (S5.3). An example of the responded setting screen is as illustrated in FIG. 9. The Web browser 300 receives the setting information input operation from the user (S5.4) and transmits the received setting request to the setting management unit 304 (S5.5). At this time too, similarly as in the case of the first exemplary embodiment, the user inputs "5 minutes" in a field of the "setting value" of the "auto sleep transit time", and the setting request is received by the Web browser 300 in S5.4. The setting request for setting the auto sleep transit time as 5 minutes is transmitted from the Web browser 300 to the setting management unit 304 (S5.5). The setting management unit 304 transmits the received setting request (S5.6).

In S7.7, the communication control unit 303 performs the obtaining request of the local user UUID and the common key with respect to the authentication unit 302. Since the common key is issued with respect to the association information between the cloud user UUID and the authentication coordination information in S7.1, the communication control unit 303 transmits the session ID to the authentication unit 302 in S7.7, it is possible to identify the requested common key. Specifically, since the association information among the local user UUID, the cloud user UUID, and the session ID is associated with the common key in S7.2, the requested common key is identified by using the session ID received from the communication control unit 303. In S7.8, the authentication unit 302 transmits the local user UUID and the common key to the communication control unit 303. As a result, the common key, the local user UUID, and the cloud user UUID are associated with one another in the service server 104. In S7.9, signature information is assigned to the setting request by using the common key. The request to be transmitted is generated as a character string in a JSON Web Token (JWT) format, and furthermore, signature information defined by JSON Web Signature (JWS) is assigned. The format of the signature information is not necessarily limited to JWT and JWS. The same also applies to the signature information which will be described below.

In S7.10, the communication control unit 303 transmits the setting request to which the signature information is assigned in S7.9 as the publish message to the function calling control unit 308 together with the local user UUID obtained in S7.8. The topic at this time is the device identification information of the device 105. With this configuration, it is possible to transmit the publish message having the same topic as the subscribe message transmitted by the function calling control unit 308 in S2.15 (the topic is the device identification information of the device 105). The setting request for setting the auto sleep transit time as 5 minutes is transmitted to the function calling control unit 308 in this case as a specific example of the setting request.

In S7.11, the function calling control unit 308 performs the obtaining request of the cloud user UUID and the common key with respect to the authentication server coordination unit 307. The authentication server coordination unit 307 responds the cloud user UUID and the common key with respect to the obtaining request in S7.11 (S7.12). In S7.6, the local user UUID, the cloud user UUID, and the common key are associated with one another in the authentication server coordination unit 307. For this reason, the authentication server coordination unit 307 can identify the cloud user UUID and the common key to be responded to the function calling control unit 308 in S7.12.

In S7.13, after the signature information assigned to the setting request is verified by using the common key received in S7.12, the function calling control unit 308 executes the setting function for setting the auto sleep transit time as 5 minutes in accordance with the contents of the publish message received in S7.10. In S7.14, the function calling control unit 308 responds the execution result of the setting request to the communication control unit 303 and assigns the signature information to the message to be transmitted at the same time. In S7.14, the function calling control unit 308 verifies the signature information assigned to the execution result by using the common key received in S7.8. After the verification of the signature information, the communication control unit 303 transmits the execution result of the setting request to the setting management unit 304 together with the cloud user UUID (S5.14).

The function calling processing in a case where the common key is used has been described above. With this configuration, it is possible to use the function made public by the device 105 via the Web browser 300, and furthermore, it is possible to perform the tempering detection of the setting request to the device 105.

Third Exemplary Embodiment

According to the first and second exemplary embodiments, the mode in which the device 105 is the multi-user device has been described. According to a third exemplary embodiment, a mode in which the device 105 is a single user device will be described with reference to FIG. 15 and FIG. 16. It should be noted however that detailed descriptions of the same procedures as those in the case of the multi-user device will be omitted by using the same step numbers. Herein, the single user device refers to a device that does not need the login operation when the function of the device is used and does not include the function for managing the plurality of local users. For this reason, the device 105 according to the third exemplary embodiment is not provided with the local login unit 306 unlike the first exemplary embodiment and the second exemplary embodiment.

Figure 15:
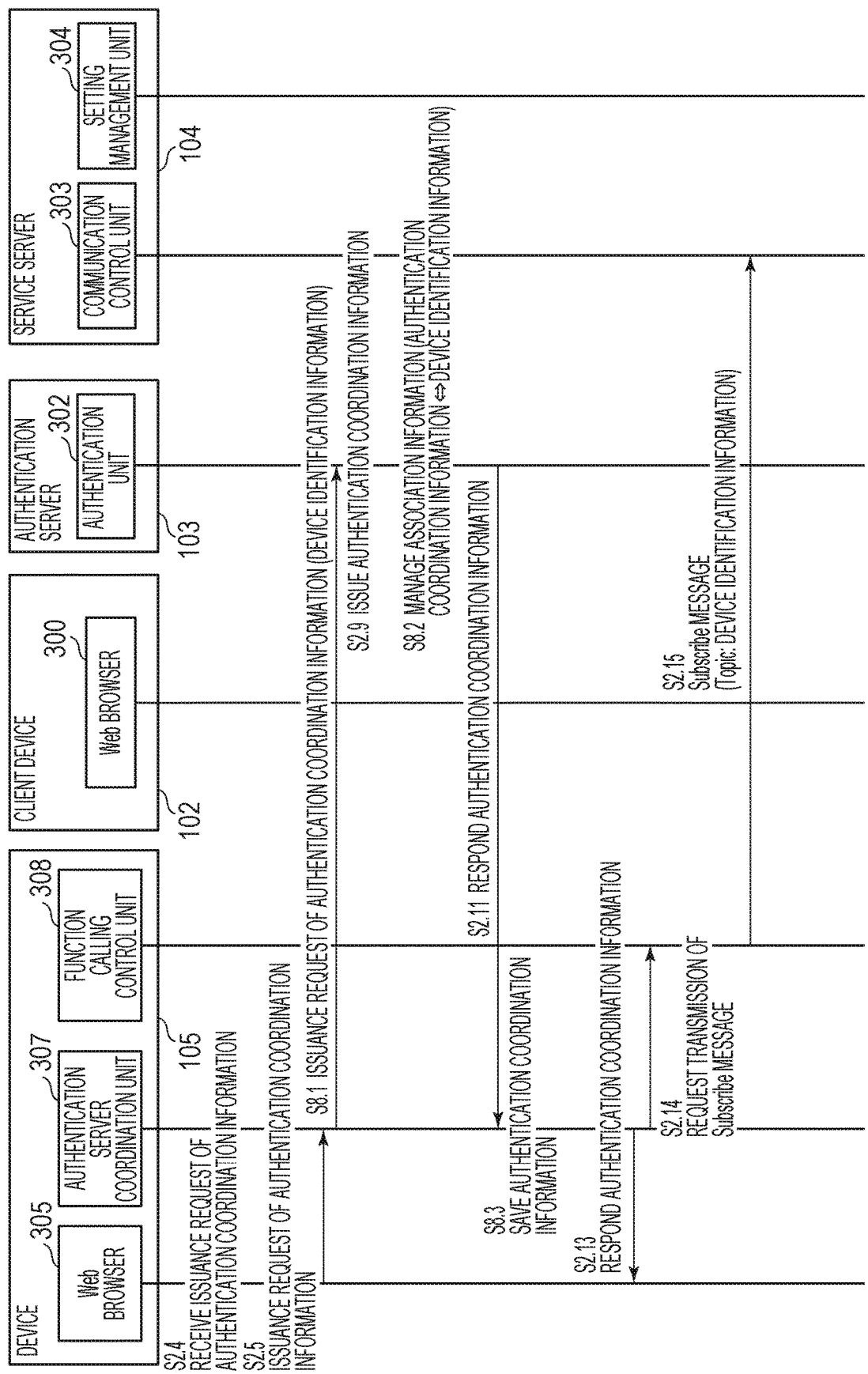
FIG. 15 is a sequence diagram illustrating a procedure for issuing the authentication coordination information in the case of a single user device according to an exemplary embodiment of the present disclosure.

The procedure for issuing the authentication coordination information in a case where the device 105 is the single user device will be described with reference to FIG. 15. A difference from the case of the multi-user device (FIG. 5) is that the device 105 is not provided with the local login unit 306, and the procedure (S2.1 to S2.3) for authenticating the local user by the login processing does not exist in FIG. 15. First, in S2.4, after the Web browser 305 receives the issuance request of the authentication coordination information, the issuance request of the authentication coordination information is transmitted to the authentication server coordination unit 307 in S2.5.

In S8.1, the authentication server coordination unit 307 transmits the device identification information to the authentication unit 302 together with the issuance request of the authentication coordination information. In S2.9, the authentication unit 302 issues the authentication coordination information. An example of the issued authentication coordination information is as illustrated in Table 2. In S8.2, the authentication unit 302 manages the association information between the authentication coordination information and the device identification information. In S2.11, the authentication unit 302 makes a response of the authentication coordination information with respect to the authentication server coordination unit 307. In S8.3, the authentication server coordination unit 307 associates the authentication coordination information received in S2.11 and the device identification information with each other to be saved. In S2.13, the authentication coordination information is responded to the Web browser 305, and the user obtains the authentication coordination information via the Web browser 305. In S2.14, for the user information association processing which will be described below, the authentication server coordination unit 307 requests the function calling control unit 308 for the transmission of the subscribe message to the communication control unit 303. In S2.15, the function calling control unit 308 transmits the subscribe message to the communication control unit 303. The topic when the subscribe message is transmitted is the device identification information.

The procedure for issuing the authentication coordination information in a case where the device 105 is the single user device has been described above. With this configuration, the association information in which the authentication coordination information and the device identification information are associated with each other can be managed by the authentication unit 302 and the authentication server coordination unit 307, and the user can obtain the authentication coordination information.

The user information association processing in the authentication server 103 in a case where the device 105 is the single user device will be described with reference to FIG. 6. The present processing is realized when S3.12 in FIG. 6 is replaced with S9.1 which will be described below. The other steps are the same as those in the case of the multi-user device, and the detailed descriptions will be omitted.

The Web browser 300 receives the input request of the authentication coordination information from the user (S3.6), and the input request of the authentication coordination information is transmitted to the authentication unit 302 (S3.7). The authentication unit 302 responds the input screen of the authentication coordination information to the Web browser 300 with respect to the received input request (S3.8). The Web browser 300 accepts the input operation of the authentication coordination information from the user via the input screen (S3.9) and transmits the accepted authentication coordination information to the authentication unit 302 together with the request of the association processing (S3.10). The authentication unit 302 performs the association processing between the cloud user UUID and the authentication coordination information by using the received authentication coordination information (S3.11). An example of the association information obtained in the association processing is as illustrated in Table 6.

In S9.1, the authentication unit 302 generates the mapping table in which the cloud user UUID and the device identification information are associated with each other. Specifically, the cloud user UUID and the device identification information are associated with each other by using the association information created in S3.11 and the association information created in S8.2 via the authentication coordination information. The user association processing in the authentication server 103 in the case of the single user device has been described above. With this configuration, the authentication unit 302 can manage the association information between the cloud user UUID and the device identification information.

Next, the user association processing in the device 105 in a case where the device 105 is the single user device will be described with reference to FIG. 7. The present processing is realized when S4.4 of FIG. 7 is replaced with S9.2 which will be described below. The other same steps as those in the case of the multi-user device are assigned with the same step numbers, and the detailed descriptions will be omitted.

The authentication unit 302 transmits the association request of the cloud user UUID to the communication control unit 303 (S4.1). The communication control unit 303 transmits the association request of the cloud user UUID to the function calling control unit 308 (S4.2). The function calling control unit 308 transmits the association request of the cloud user UUID to the authentication server coordination unit 307 (S4.3). At this time, the notification of the authentication coordination information and the cloud user UUID received in S4.2 is also performed at the same time. In S9.2, the association information in which the cloud user UUID and the device identification information are associated with each other is managed. Since the authentication server coordination unit 307 manages the association information between the device identification information and the authentication coordination information (S8.3), the cloud user UUID and the device identification information can be associated with each other in S9.2 by using the association information and the information received in S4.3.

The user association processing in the device 105 in the case of the single user device has been described above. With this configuration, the association information between the device identification information and the cloud user UUID can be managed in the authentication server coordination unit 307. In addition, the device 105 can use an encryption key in the present processing too similarly as in the case of the multi-user device. At this time, the common key is issued in S9.2 to be associated with the association information between the cloud user UUID and the device identification information.

Figure 16:
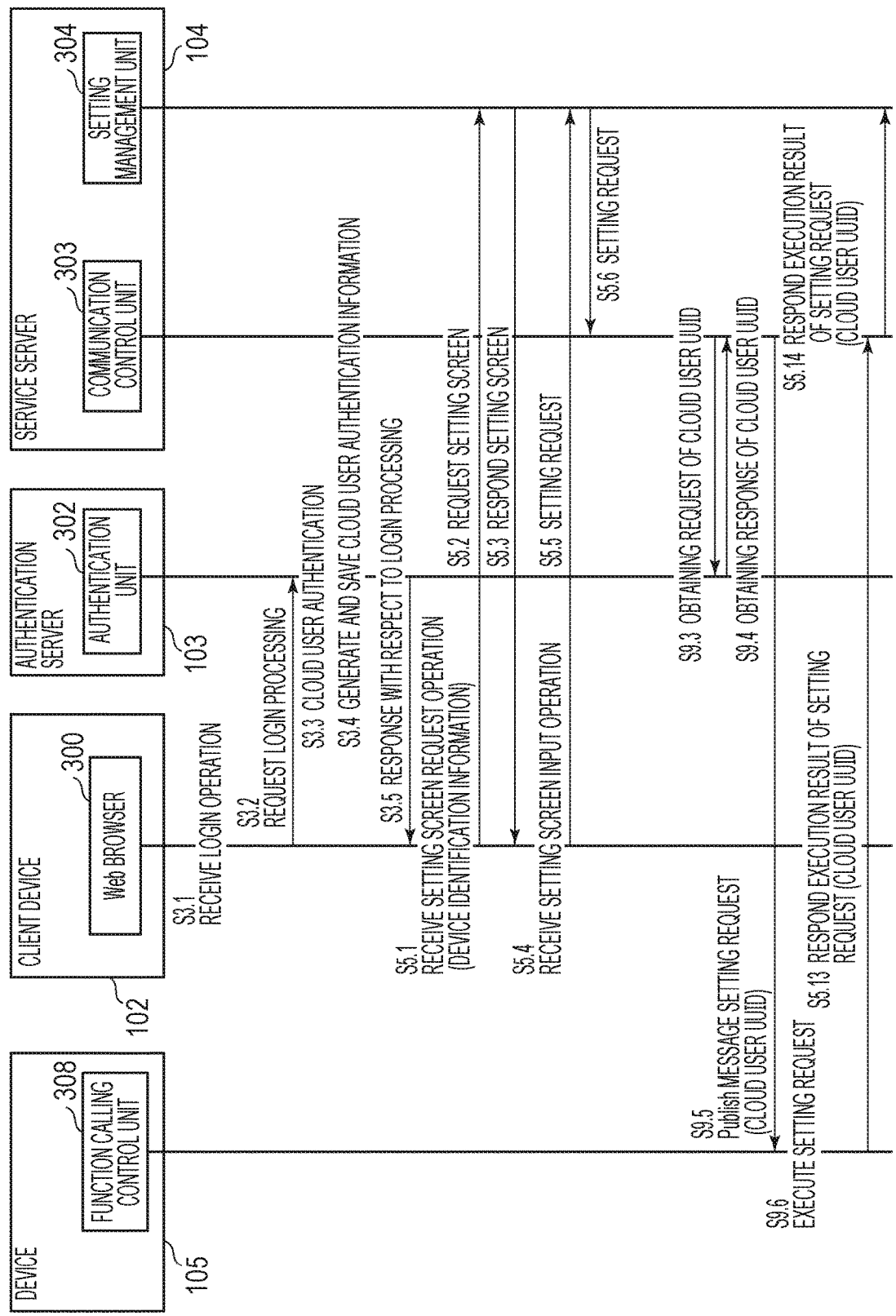
FIG. 16 is a sequence diagram illustrating the function calling processing in the device in the case of the single user device according to an exemplary embodiment of the present disclosure.

Next, the function calling processing in the case of the single user device will be described with reference to FIG. 16. The same steps as those in the case of the multi-user device are assigned with the same step numbers, and the detailed descriptions will be omitted. First, the Web browser 300 receives the setting screen request operation from the user together with the device identification information (S5.1). The Web browser 300 requests the setting management unit 304 for the setting screen (S5.2), and the setting management unit 304 makes a response with respect to the Web browser 300 (S5.3). An example of the setting screen at this time is as illustrated in FIG. 9. The Web browser 300 receives the setting information input operation from the user (S5.4) and transmits the setting request to the setting management unit 304 (S5.5). The setting management unit 304 transmits the setting request to the communication control unit 303 (S5.6).

In S9.3, the communication control unit 303 performs the obtaining request of the cloud user UUID with respect to the authentication unit 302. Specifically, when the setting management unit 304 transmits the session ID, which has been transmitted to the setting management unit 304 by the Web browser 300 in S5.5, to the communication control unit 303, the session ID is transmitted together with the obtaining request of the cloud user UUID in S9.3. The authentication unit 302 identifies the cloud user UUID associated with the received session ID, and the obtaining response of the cloud user UUID is performed with respect to the communication control unit 303 in S9.4.

In S9.5, the communication control unit 303 transmits the publish message to the function calling control unit 308 as the setting request and also transmits the cloud user UUID at the same time. With this configuration, it is possible to transmit the publish message having the same topic as the subscribe message transmitted by the function calling control unit 308 in S2.15 (the topic is the device identification information). In S5.4, when it is assumed that the Web browser 300 accepts the setting request for setting the auto sleep transit time as 5 minutes, the setting request transmitted in S9.5 is the setting request for setting the auto sleep transit time as 5 minutes.

In S9.6, the function calling control unit 308 executes the setting request in accordance with the contents of the publish message received in S5.9. At this time, the setting request is executed as the cloud user identified by the cloud user UUID received together with the setting request. Specifically, in a case where the function calling control unit 308 receives the cloud user UUID "CCC1", the setting for setting the auto sleep transit time as 5 minutes is executed as the cloud user ID "se001".

In S5.13, the function calling control unit 308 responds the execution result with respect to the communication control unit 303 together with the cloud user UUID obtained in S5.12. In S5.14, the communication control unit 303 transmits the execution result to the setting management unit 304 together with the cloud user UUID. The function calling processing in a case where the device 105 is the single user device has been described above. With this configuration, even in a case where the device 105 is the single user device, the user can use the function made public by the device 105 via the Web browser 300 of the client device 102 and check the execution result based on the use of the function.

A case where the association is performed by using the encryption key in the user information association processing will also be described. In this case, in S9.4, the authentication unit 302 obtains the common key at the same time as the cloud user UUID. In S9.5, the signature information is assigned to the requested message by using the obtained common key. After the function calling control unit 308 verifies the signature information by using the common key, the setting request is executed in S9.6.

Before the execution result is transmitted in S5.13, the common key associated with the cloud user UUID received in S9.5 in the authentication server coordination unit 307 is obtained, and the signature information is assigned to the execution result. The communication control unit 303 that has received the execution result verifies the signature information assigned to the execution result by using the common key. After the verification, in S5.14, the communication control unit 303 responds the execution result to the setting management unit 304 together with the cloud user UUID. Similarly as in a case where the device 105 is the multi-user device, the configuration is not limited to the common key. For example, the signature information can be similarly assigned by the public key too.

According to the third exemplary embodiment, when the function of the single user device is executed via the cloud system, the cloud system 106 can identify the cloud user UUID to which the execution result corresponds to be associated with the request and the response.

In addition, according to the first exemplary embodiment and the third exemplary embodiment, the sequence such as the procedure for issuing the authentication coordination in the association processing of formation or the user UUID varies depending on whether the device 105 is the single user device or the multi-user device. For this reason, it is necessary to previously determine whether the device 105 is the multi-user device or the single user device.

A method of using the device identification information of the device 105 is proposed as one of determination methods. Information indicating whether the device 105 is the single user device or the multi-user device is also previously included in the device identification information other than the information for uniquely identifying the device 105. An example of the information is illustrated in Table 9.

TABLE 9

| Device identification information |
|---|
| 00001-00 |
| 00002-01 |
| 00003-01 |

Table 9 illustrates an example in which the device is the single user device in a case where final numbers of the device identification information are "00", and the device is the multi-user device in a case where the final numbers are "01". It should be noted however that the mode in which the information related to the device 105 is included in the device identification information is not limited to the mode of Table 9.

In S1.3, the communication unit 301 transmits the authentication unit 302 to the device registration request and also performs the notification of the device identification information received from the authentication server coordination unit 307 at the same time. With the device identification information (Table 9), it is possible to determine whether or not the device 105 is the multi-user device.

The second determination method is a method in which the authentication unit 302 previously holds a table (Table 10). The authentication unit 302 previously holds a table for managing the information indicating whether the device 105 is the single user device or the multi-user device, and the determination of the device 105 can be performed by referring to the table. An example of the table is illustrated in Table 10.

TABLE 10

| Device identification information | Device type |
|---|---|
| 00001 | Single |
| 00002 | Multi |
| 00003 | Multi |

Herein, the numeric values are described as the device identification information as an example, but any information may be used as long as the device 105 can be uniquely identified. In addition, the determination on whether the device 105 is the multi-user device or the single user device may be executed by the communication unit 301, the authentication unit 302, or the communication control unit 303. The determination may be performed at any timing before the sequence such as the procedure for issuing the authentication coordination in the association processing of formation or the user UUID is started.

According to the third exemplary embodiment, even in a case where the device 105 is the single user device, the user can use the function made public by the device 105 via the cloud system 106 of the client device 102 and check the execution result based on the use of the function. Furthermore, it is possible to determine which one of the sequences according to the first exemplary embodiment and the third exemplary embodiment to be executed by determining whether or not the device 105 is the multi-user device.

Fourth Exemplary Embodiment

According to the first exemplary embodiment, the user obtains the authentication coordination information in the device 105 and inputs the obtained authentication coordination information to the client device 102 to associate the local user UUID and the cloud user UUID with each other. According to a fourth exemplary embodiment, a mode will be described in which the client device 102 obtains the authentication coordination information and inputs the obtained authentication coordination information to the device 105 to be associated with the local user UUID and the cloud user UUID.

Figure 17:
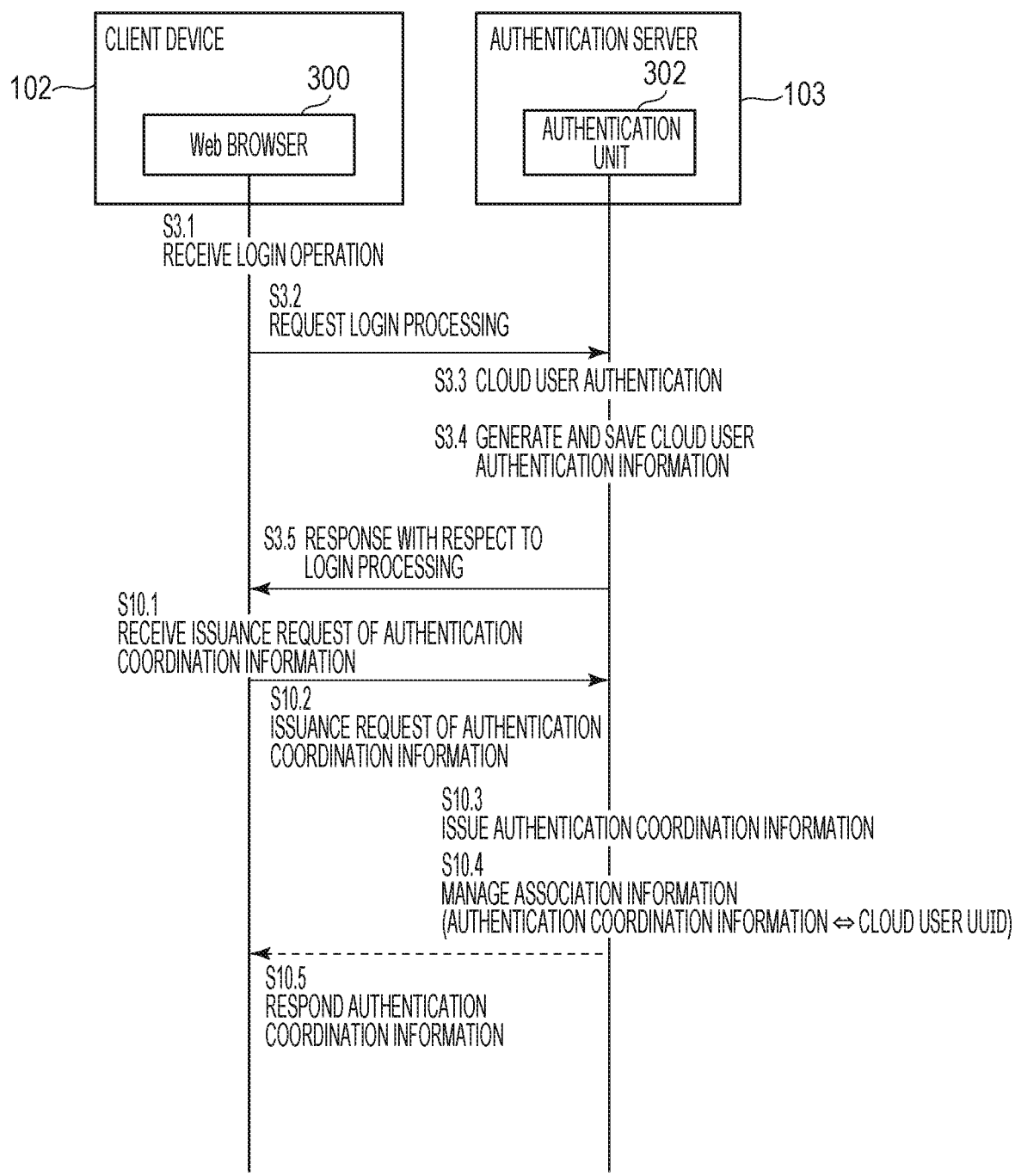
FIG. 17 is a sequence diagram illustrating the procedure for issuing the authentication coordination information in the client device according to an exemplary embodiment of the present disclosure.

First, the issuance processing of the authentication coordination information in the client device 102 will be described with reference to FIG. 17. The Web browser 300 receives the issuance request of the authentication coordination information in S10.1 and performs the issuance request of the authentication coordination information with respect to the authentication unit 302 in S10.2. In S10.3, the authentication unit 302 issues the authentication coordination information with respect to the issuance request in S10.2. As illustrated in Table 2, the authentication coordination information is set as the character string, but the configuration is not limited to the above. In S10.4, the authentication unit 302 associates the authentication coordination information issued in S10.3 and the cloud user UUID of the currently logged-in cloud user with each other. Specifically, since the authentication unit 302 receives the session ID together with the issuance request of the authentication coordination information in S10.2, the authentication coordination information issued in S10.3 and the cloud user UUID are associated with each other via the session ID. An example of the association information generated at this time is as illustrated in Table 11.

TABLE 11

| Cloud user UUID | Authentication coordination information |
|---|---|
| CCC1 | XXX-YYY-ZZZ |

In S10.5, the authentication unit 302 responds the authentication coordination information with respect to the Web browser 300. When the Web browser 300 displays the received authentication coordination information, the user can obtain the authentication coordination information. The issuance processing of the authentication coordination information in the client device 102 has been described above.

Figure 18:
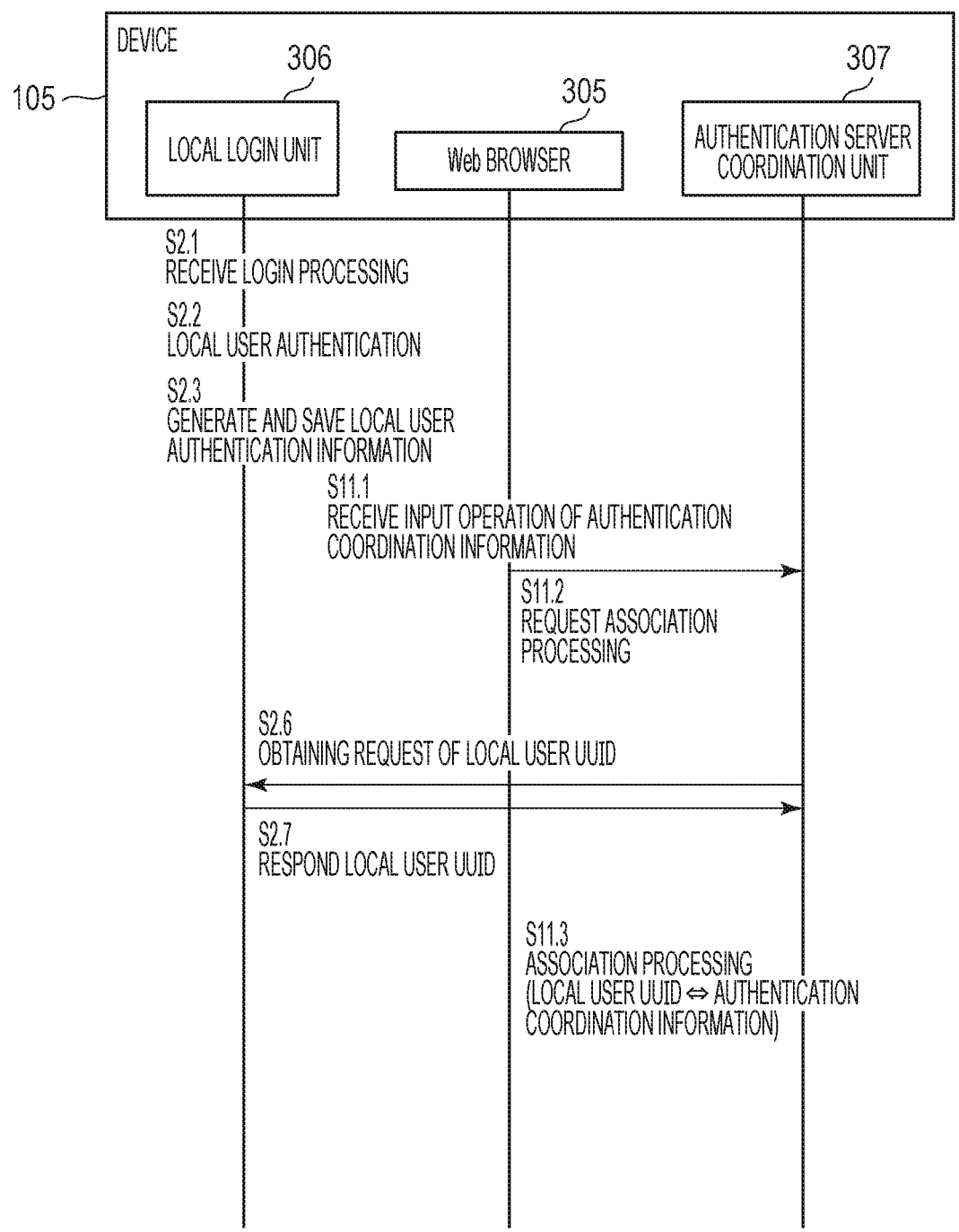
FIG. 18 is a sequence diagram illustrating the user association processing for associating the local user UUID and the authentication coordination information with each other in the device according to an exemplary embodiment of the present disclosure.

Next, the user association processing for associating the local user UUID and the authentication coordination information with each other in the device 105 will be described with reference to FIG. 18. It should be noted however that the same step numbers are used for the procedures that are the same as the already described procedures, and detailed descriptions will be omitted. In S2.1, the local login unit 306 receives the login processing of the user. An example of the user information managed by the local login unit 306 is as illustrated in Table 1. In S2.2, the local login unit 306 refers to the user information in Table 1 and performs the local user authentication by using the combination of the local user ID and the password. In S2.3, the local login unit 306 generates and saves the local user authentication information of the authenticated user.

In S11.1, the Web browser 305 accepts the input operation of the authentication coordination information from the user and requests the authentication server coordination unit 307 for the association processing of the authentication coordination information in S11.2 after the completion of the authentication coordination information. In S2.6 and S2.7, the authentication server coordination unit 307 obtains the local user UUID from the local login unit 306. In S11.3, the authentication server coordination unit 307 associates the local user UUID and the authentication coordination information with each other in the authentication server coordination unit 307. The association information generated at this time is illustrated in Table 12.

TABLE 12

| Local user UUID | Authentication coordination information |
|---|---|
| AAA1 | XXX-YYY-ZZZ |

The user association processing for associating the local user UUID and the authentication coordination information with each other in the device 105 has been described above.

Next, the user association processing for associating the local user UUID and the cloud user UUID with each other in the authentication server 103 will be described with reference to FIG. 19. In S12.1, the authentication server coordination unit 307 transmits the authentication coordination information, the local user UUID, and the device identification information to the authentication unit 302 at the same time and performs the association request of the authentication coordination information. In S12.2, the authentication unit 302 associates the authentication coordination information received in S12.1, the local user authentication coordination information, and the device identification information with one another. An example of the mapping table created at this time is as illustrated in Table 3. In S12.3, the authentication unit 302 associates the cloud user UUID, the local user UUID, and the device identification information with one another by using the association information (Table 3 and Table 11). An example of the mapping table created at this time is as illustrated in Table 7. In S12.4, the authentication unit 302 transmits the cloud user UUID and the authentication coordination information to the authentication server coordination unit 307 and makes a response with respect to the association request. In S12.5, the authentication server coordination unit 307 associates the authentication coordination information received in S12.4 and the cloud user UUID with each other. In S12.6, the authentication server coordination unit 307 associates the cloud user UUID and the local user UUID with each other by using the association information associated in S12.5 and the association information associated in S11.3. An example of the mapping table created at this time is as illustrated in Table 8. In S12.7, as a response to the request of the association processing in S11.2, the authentication server coordination unit 307 responds a state in which the association processing is completed with respect to the Web browser 305. With this configuration, the user is notified that the association processing is completed.

The user association processing for associating the local user UUID and the cloud user UUID with each other in the authentication server 103 has been described above. Since the function calling processing after the user association processing for associating the local user UUID and the cloud user UUID with each other is similar to the first exemplary embodiment (FIG. 8), descriptions thereof will be omitted.

According to the fourth exemplary embodiment too, a case where the device 105 is the single user device is conceivable. A difference from the case of the multi-user device is that the local user authentication information does not exist in the authentication unit 302 and the authentication server coordination unit 307 at the time of the generation of the user the mapping table. In addition, the encryption key can be exchanged according to the fourth exemplary embodiment similarly as in the second exemplary embodiment.

A way to appropriately use the procedures according to the first exemplary embodiment and the fourth exemplary embodiment depends on device characteristics of the device 105 and the client device 102 and use cases. For example, in the case of the first exemplary embodiment, when the device 105 is a device such as an SFP that is not adequate to a user input and the client device 102 is a camera-mounted terminal such as a smart phone, the QR code (registered trademark) is displayed on the Web browser 305 of the device 105 as the authentication coordination information, and the camera mounted to the client device 102 reads the QR code (registered trademark), so that it is possible to perform the association request with respect to the authentication unit 302.

On the other hand, in the case of the fourth exemplary embodiment, for example, when the device 105 is a device such as an MFP that can accept the user input and the client device 102 is a terminal to which a camera is not mounted such as a PC, a character string is displayed on the Web browser 300 as the authentication coordination information, and the user obtains the authentication coordination information. Thus, the association request can be performed with respect to the authentication unit 302 by inputting the authentication coordination information to the device 105. That is, it is possible to change the user association processing and procedure in accordance with the modes of the client device 102 and the device 105 by appropriately using the procedures according to the first exemplary embodiment and the fourth exemplary embodiment.

Other Embodiments

The information received and transmitted in the steps illustrated in the above-described exemplary embodiments is limited to the information illustrated as the example in the above. Any information may be received and transmitted as long as the above-described information is included. For example, a mode is conceivable in which the cloud user UUID is transmitted together with the other cloud user authentication information such as the cloud user ID, for example. The same also applies to the case of the local user UUID.

Various embodiments can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described respective exemplary embodiments, when the function of the device 105 is executed from the client device 102 via the cloud system 106, the execution can be performed by using the local user UUID associated with the cloud user UUID. Furthermore, no identifier for associating the request and the response with each other is used in asynchronous processing between the cloud system 106 and the device 105, and it is possible to notify the cloud user of the function of the execution result of the device 105.

Exemplary embodiments of the present disclosure have been described in detail above, but the present disclosure is not limited to the particular described exemplary embodiments, and various modifications and alterations can be performed without departing from the spirit or scope of the subject matter described in the present disclosure.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-098378, filed May 17, 2017, which is hereby incorporated by reference herein in its entirety.

What is claimed is:

1. An information processing system comprising:
    a cloud system; and
    a device;
    wherein the cloud system includes at least one first processor and at least one first memory coupled to the at least one first processor, the at least one first memory having stored thereon instructions which, when executed by the at least one first processor, cause the at least one first processor to perform operations comprising:
    managing, on the cloud system, cloud user authentication information for uniquely identifying a cloud user who uses a cloud service associated with local user authentication information for uniquely identifying a local user who uses a function of a device;
    managing, on the device, the cloud user authentication information associated with the local user authentication information;
    causing the cloud system to perform first receiving to receive, from a client device, a request for executing the function of the device with the cloud user authentication information;
    causing the cloud system perform first exchanging to exchange the cloud user authentication information received by the first receiving, for the local user authentication information managed by the managing performed on the cloud system;
    causing the cloud system to perform first transmitting to transmit, to the device, the local user authentication information and an execution request corresponding to the request;
    wherein the device includes at least one second processor and at least one second memory coupled to the at least one second processor, the at least one second memory having stored thereon instructions which, when executed by the at least one second processor, cause the at least one second processor to perform operations comprising:
    causing the device to receive, from the cloud system, the local user authentication information and the execution request;
    causing the device to exchange the local user authentication information for the cloud user authentication information managed by the second management unit; and
    causing the device to execute the execution request transmitted by the first transmitting on a basis of the local user authentication information transmitted by the first transmitting and causing the device to transmit, to the cloud system, the cloud user authentication information and an execution result obtained by executing the execution request.

2. The information processing system according to claim 1, wherein the operations further comprise:
    performing cloud user authentication by receiving the cloud user authentication information from the client device and authenticating the cloud user,
    wherein the information processing system receives the request for executing the function of the device from the client device after the cloud user is authenticated by the cloud user authentication and transmits, to the device, the local user authentication information associated with the cloud user authentication information and managed by the managing on the cloud system, and the execution request corresponding to the request.

3. The information processing system according to claim 1,
    wherein the cloud user authentication information is a cloud user universally unique identifier (UUID) that uniquely identifies the cloud user and is not duplicative with the other cloud user authentication information, and wherein the local user authentication information is a local user UUID that uniquely identifies the local user and is not a duplicate of the other local user authentication information.

4. The information processing system according to claim 1,
wherein the managing on the cloud system manages cloud association information in which the cloud user authentication information and the local user authentication information are associated with each other via authentication coordination information for associating the cloud user authentication information and the cloud user authentication information with each other, and
wherein the managing on the device manages device association information in which the cloud user authentication information and the local user authentication information are associated with each other via the authentication coordination information.

5. The information processing system according to claim 4, wherein, when a user logs into the client device and an issuance request for issuing the authentication coordination information is transmitted to the cloud system, the cloud system issues the authentication coordination information.

6. The information processing system according to claim 4, wherein, when a user logs into the device and an issuance request for issuing the authentication coordination information is transmitted to the cloud system, the cloud system issues the authentication coordination information.

7. The information processing system according to claim 4, wherein the information processing system assigns signature information to the execution request for executing the function of the device by using an encryption key associated with the cloud association information and transmits the execution request to the device, and the signature information is verified in the device.

8. The information processing system according to claim 7, wherein the information processing system assigns the signature information to the execution result by using the encryption key associated with the device association information and transmits the execution result to the cloud system, and the signature information is verified in the cloud system.

9. The information processing system according to claim 1, wherein the operations further comprise:
determining whether the device is a multi-user device that needs a login operation by a user or a single user device that does not need the login operation,
wherein, in a case where the determining determines that the device is the single user device,
the first transmission unit transmits the cloud user authentication information and the execution request to the device, and
the information processing system transmits, to the cloud system, the execution result obtained by executing the execution request and the cloud user authentication information received together with the execution request.

10. A control method comprising:
managing, on a cloud system, cloud user authentication information for uniquely identifying a cloud user who uses a cloud service associated with local user authentication information for uniquely identifying a local user who uses a function of a device;
managing, on the device, the cloud user authentication information associated with the local user authentication information;
causing the cloud system to receive, from a client device, a request for executing the function of the device with the cloud user authentication information;
causing the cloud system to exchange the received cloud user authentication information, for the local user authentication information managed by the managing on the cloud system;
causing the cloud system to transmit, to the device, the local user authentication information and an execution request corresponding to the request;
causing the device to receive, from the cloud system, the local user authentication information and the execution request;
causing the device to exchange the local user authentication information for the cloud user authentication information managed by the managing on the device; and
causing the device to execute the transmitted execution request on a basis of the transmitted local user authentication information and to transmit, to the cloud system, the cloud user authentication information and an execution result obtained by executing the execution request.

11. A non-transitory storage medium storing instructions that when executed by one or more processors controls the one or more processors to perform operations comprising:
managing, on a cloud system, cloud user authentication information for uniquely identifying a cloud user who uses a cloud service associated with local user authentication information for uniquely identifying a local user who uses a function of a device;
managing, on the device, the cloud user authentication information associated with the local user authentication information;
causing the cloud system to receive, from a client device, a request for executing the function of the device with the cloud user authentication information;
causing the cloud system to exchange the received cloud user authentication information, for the local user authentication information managed by the managing on the cloud system;
causing the cloud system to transmit, to the device, the local user authentication information and an execution request corresponding to the request;
causing the device to receive, from the cloud system, the local user authentication information and the execution request;
causing the device to exchange the local user authentication information for the cloud user authentication information managed by the managing on the device; and
causing the device to execute the transmitted execution request on a basis of the transmitted local user authentication information and to transmit, to the cloud system, the cloud user authentication information and an execution result obtained by executing the execution request.

* * * * *